United States Patent [19]
Date et al.

[11] Patent Number: 5,923,339
[45] Date of Patent: Jul. 13, 1999

[54] HIGHER-SPEED PARALLEL PROCESSING

[75] Inventors: Atsushi Date, Tokyo; Kazumasa Hamaguchi; Masato Kosugi, both of Yokohama; Toshiyuki Fukui, Kawasaki, all of Japan

[73] Assignee: Canon Kabushiki Kaisha, Tokyo, Japan

[21] Appl. No.: 08/978,813

[22] Filed: Nov. 26, 1997

Related U.S. Application Data

[63] Continuation of application No. 08/350,101, Nov. 29, 1994, abandoned.

[30] Foreign Application Priority Data

Nov. 29, 1993 [JP] Japan .................................. 5-297799

[51] Int. Cl.⁶ .................................................. G06F 15/80
[52] U.S. Cl. .......................... 345/505; 345/506; 345/511; 395/311
[58] Field of Search ..................... 395/502, 505, 395/506, 508, 510, 511, 202; 395/311, 312, 842, 853; 359/109, 114, 123, 124

[56] References Cited

U.S. PATENT DOCUMENTS

| | | | |
|---|---|---|---|
| 4,195,344 | 3/1980 | Yamazaki ................................ | 395/311 |
| 4,949,280 | 8/1990 | Littlefield ................................ | 395/163 |
| 5,226,125 | 7/1993 | Balmer et al. .......................... | 395/312 |
| 5,315,699 | 5/1994 | Imai et al. .............................. | 395/163 |
| 5,369,738 | 11/1994 | Bremner, III .......................... | 395/163 |
| 5,386,546 | 1/1995 | Hamaguchi ............................ | 395/460 |
| 5,408,606 | 4/1995 | Eckart .................................... | 395/163 |
| 5,473,750 | 12/1995 | Hattori ................................... | 395/163 |

OTHER PUBLICATIONS

H. Ueda et al, "A Multiprocessor system utilizing Enhanced DSP's for image processing", IEEE Computer Soc. Press. pp. 611–620, May 25–17, 1988.

*Primary Examiner*—Kee M. Tung
*Attorney, Agent, or Firm*—Fitzpatrick, Cella, Harper & Scinto

[57] ABSTRACT

An information processing apparatus which processes a large amount of data at high speed. The synchronizing signal has a cycle including a transfer period and a processing period. In the transfer period, data is transferred, e.g., from a data input unit to a first memory, and from the first memory to a second memory. In the processing period, the data input unit reads data for one frame of a digital video image, and a data output unit displays an image based on the image data. Processors respectively perform predetermined processing upon data stored in a memory connected to the processor. Thus, within one cycle of the synchronizing signal, processing is completed at respective stages from input to output. Note that the connection between the memories and the processors may be changed for performing the processing at the respective stages without data transfer. In this case, data transfer time can be saved.

17 Claims, 22 Drawing Sheets

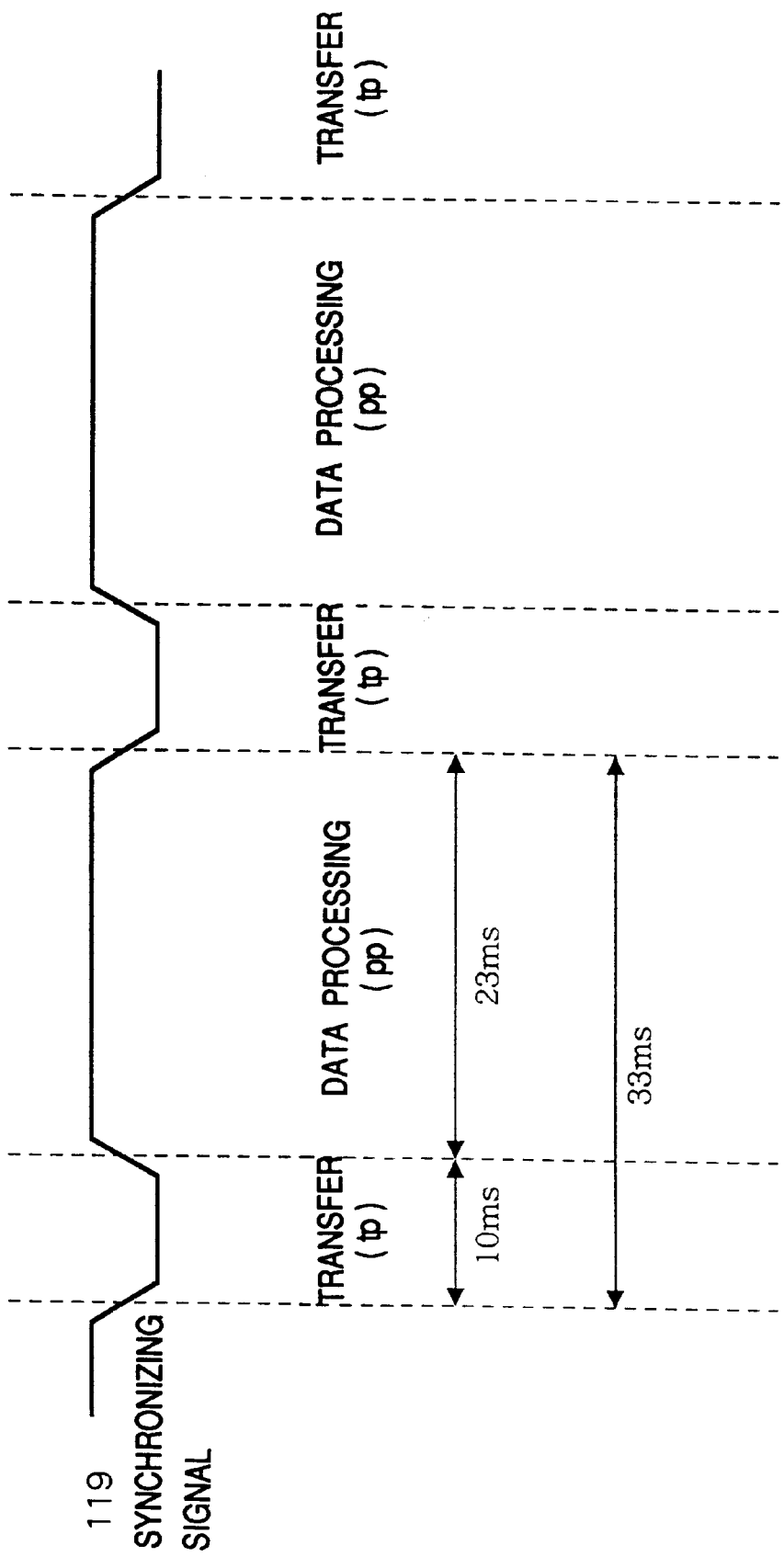

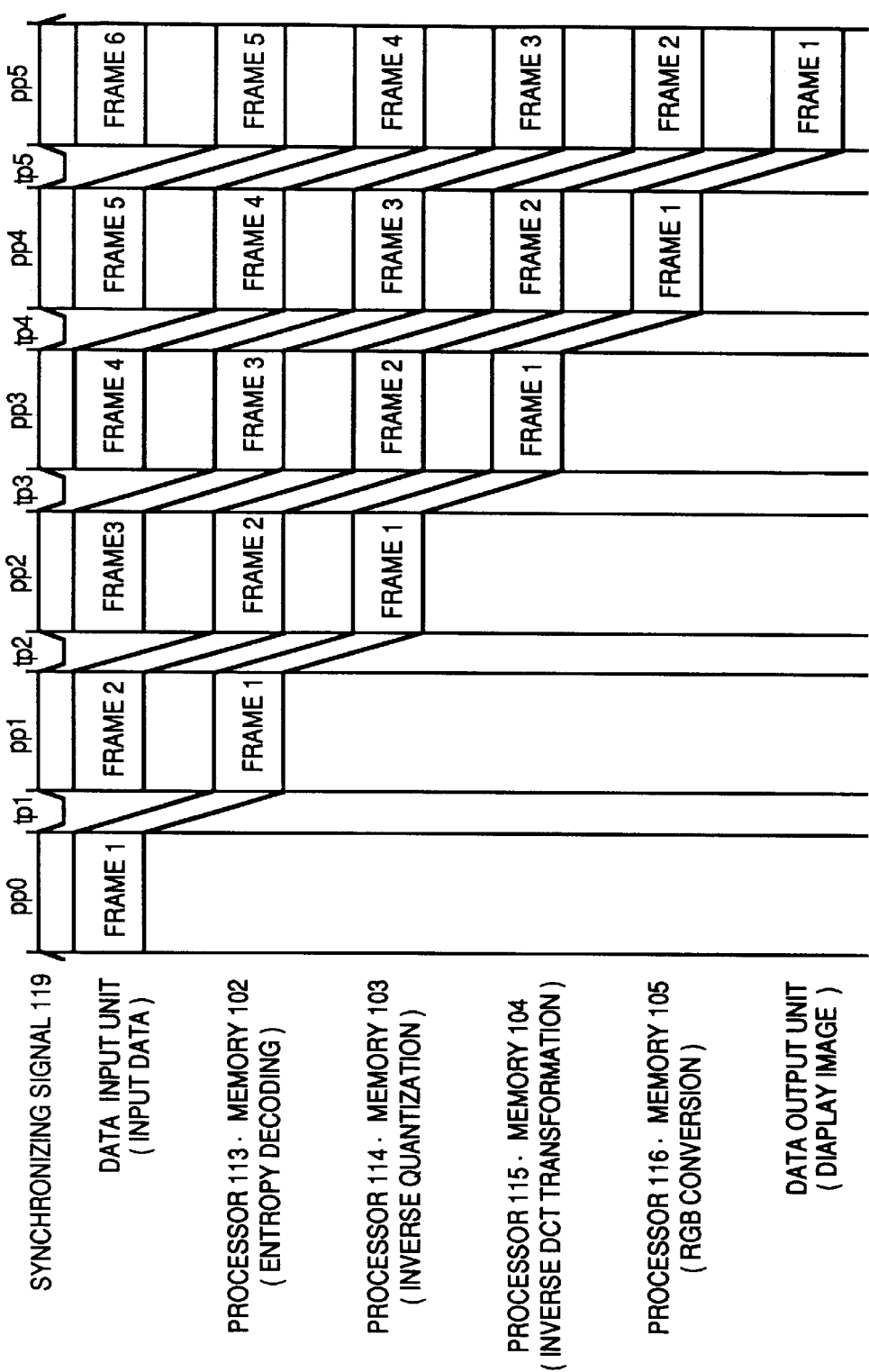

|  | P0 | P1 | P2 | P3 | P4 | P5 |
|---|---|---|---|---|---|---|
| DATA INPUT UNIT 801 | MB813 | MB818 | MB817 | MB816 | MB815 | MB814 |
| PROCESSOR UNIT 803 | MB814 | MB813 | MB818 | MB817 | MB816 | MB815 |
| PROCESSOR UNIT 804 | MB815 | MB814 | MB813 | MB818 | MB817 | MB816 |
| PROCESSOR UNIT 805 | MB816 | MB815 | MB814 | MB813 | MB818 | MB817 |
| PROCESSOR UNIT 806 | MB817 | MB816 | MB815 | MB814 | MB813 | MB818 |
| DATA OUTPUT UNIT 807 | MB818 | MB817 | MB816 | MB815 | MB814 | MB813 |

\* MB : MEMORY BANK

HIGHER-SPEED PARALLEL PROCESSING

This application is a continuation, of application Ser. No. 08/350,101, filed Nov. 29, 1994, now abandoned.

BACKGROUND OF THE INVENTION

Present invention relates to an information processing apparatus which performs parallel data processing by, e.g., using a plurality of processors.

Conventional information processing apparatuses such as a computer system include a multi-processor system comprising a plurality of processors, as well as a general system comprising a single processor. The multi-processor systems include a shared memory type multi-processor system where a plurality of processors share a memory, a calculation pipeline system where processors are connected with a pipeline and an area dividing type multi-processor system where an image memory is divided into a plurality of small storage areas respectively assigned to processors.

Recently, in processing continuous digital data such as digital video data, which must be processed within a limited time period, a need for using a general-purpose computer system for processing such data in real time is arising. Such digital data is real-time data which requires processing to be completed within a predetermined period.

For example, in a case where digital video data of 480×640 dots in accordance with the currently standard NTSC specifications is processed in real time, i.e., 30 frames per second, the above-mentioned conventional single-processor type computer system cannot perform processing at a calculation speed required.

In the shared memory type multi-processor system, access conflict occurs to a memory system upon inputting/outputting and displaying data or processing by the plurality of processors, thus disturbing high-speed processing.

In a pipeline processing system where data processing is performed in fine-grain data units, the amount of data to be transferred at once on a data transfer path between calculation stages is small, typically one word. Further, systems generally have no large capacity memory for random access in pipeline processing respective stages. For these reasons, this system cannot perform high-speed real-time processing when the amount of data to be processed simultaneously is large and continuous such as processing data on digital video images.

In addition to the above systems, an image-area dividing type multi-processor system where image data is divided into a plurality of areas to be assigned to a plurality of processors for high-speed image processing is known. This system usually have a memory system divided into many independent small areas to raise processing speed after data to be processed is loaded onto the memory. In this system, continuous processing of digital video data in actual executing time is impossible due to long data loading/read-out time.

SUMMARY OF THE INVENTION

The present invention has been made in consideration of the above situation, and has as its object to provide an information processing apparatus which processes a large amount of data at a high-speed.

According to the present invention, the above object is attained by providing an information processing apparatus comprising: storage means for storing data into a plurality of independent storage areas; processing means including a plurality of processors for respectively performing a predetermined processing upon the data stored in the plurality of storage areas; and control means for controlling said processing means by assessing a processor of the plurality of processors to an area of a plurality of independent areas.

Another object of the present invention is to provide an information processing apparatus which processes a large amount of data at high-speed with a simple construction.

According to the present invention, the above objects is attained by providing an information processing apparatus comprising: memory means for storing data into a plurality of independent storage areas; a plurality of processing means for simultaneously processing data stored in the plurality of storage areas; and a plurality of transfer means for transferring data processed by said plurality of processing means from each of the plurality of storage areas to another one of the plurality of storage areas.

Further, the above object is attained by providing an information processing apparatus comprising: storage means for storing data into a plurality of independent storage areas; processing means having a plurality of processors for respectively processing data stored in the plurality of storage areas; connecting means for connecting the plurality of storage areas to the plurality of processors; and control means for changing connection between the plurality of storage areas and the plurality of processors by said connecting means.

Further, the above object is attained by providing an information processing apparatus comprising: a plurality of independent memory units; input means for inputting compressed video image data into one of the plurality of independent memory units; a plurality of processors, respectively connected to the plurality of independent memory units, for performing a predetermined stage of decoding of video image data on data stored therein; a DMA unit for serially-connecting the plurality of independent memory units and DMA-transferring the data stored in one of the plurality of independent memory units to another of the plurality of independent memory unit; and display means for displaying an image based on data processed by all the plurality of processors and stored in one of the plurality of independent memory units.

Further, the above object is attained by providing an information processing apparatus comprising: a plurality of independent memory units; input means for inputting compressed video image data into one of the plurality of independent memory units; a plurality of processors for simultaneously performing processing at a predetermined stage of decoding of video image data upon data stored in the plurality of memory units; a switching network for connecting the plurality of memory units to the plurality of processors via buses arranged in a two-dimensional mesh and switches arranged at each intersection of the mesh of buses; switching means for connecting the plurality of independent memory units to the plurality of processors on a one to one basis by the switching network, and switching over connections between the pairs in a predetermined order; and display means for displaying data processed by all the plurality of processors and stored in one of the plurality of independent memory units.

Further, the above object is attained by providing an information processing apparatus comprising: a plurality of independent memory units; input means for inputting compressed video image data into one of the plurality of independent memory units; a plurality of fixed optical wavelength communication means for transmitting optical signals having wavelengths different from each other, corresponding to the plurality of independent memory units; wavelength-selecting communication means for selecting optical signals of a desired one of the wavelengths transmitted by said plurality of fixed wavelength communication means; a plurality of processors, connected to said wavelength-selecting communication means, for simultaneously performing processing predetermined stages of decoding of video image data upon data stored in the plurality of independent memory units; switching means for switching the plurality of independent memory units and the plurality of processors in a predetermined order by changing the selecting wavelength of the optical signals carried by said wavelength-selecting communication means; and display means for displaying an image based on data processed by all the plurality of processors and stored in one of the plurality of independent memory units.

Although the conventional calculation systems cannot achieve high-speed processing on continuous data, such as digital video data, which requires a large amount of processing in a limited processing time, the present invention having the above constructions can perform high-speed processing of such large amount continuous data.

Further, the present invention shortens the processing time by overlapping data transfer and data transfer.

Furthermore, the present invention enables down-sizing of circuits by employing wavelength-division-multiplexed optical signals to connect the memories and processors.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a timing chart showing the timing of a synchronizing signal;

FIG. 7 is an explanatory view of image-unit processing according to the first embodiment;

DETAILED DESCRIPTION OF THE PREFERRED EMBODIMENT(S)

Preferred embodiments of the present invention will be described in detail in accordance with the accompanying drawings.

[First Embodiment]

A multi-processor system for reproducing data compressed in accordance with the JPEG Recommendations as a first embodiment of the present invention will be described below.

<System Configuration>

Figure 1:
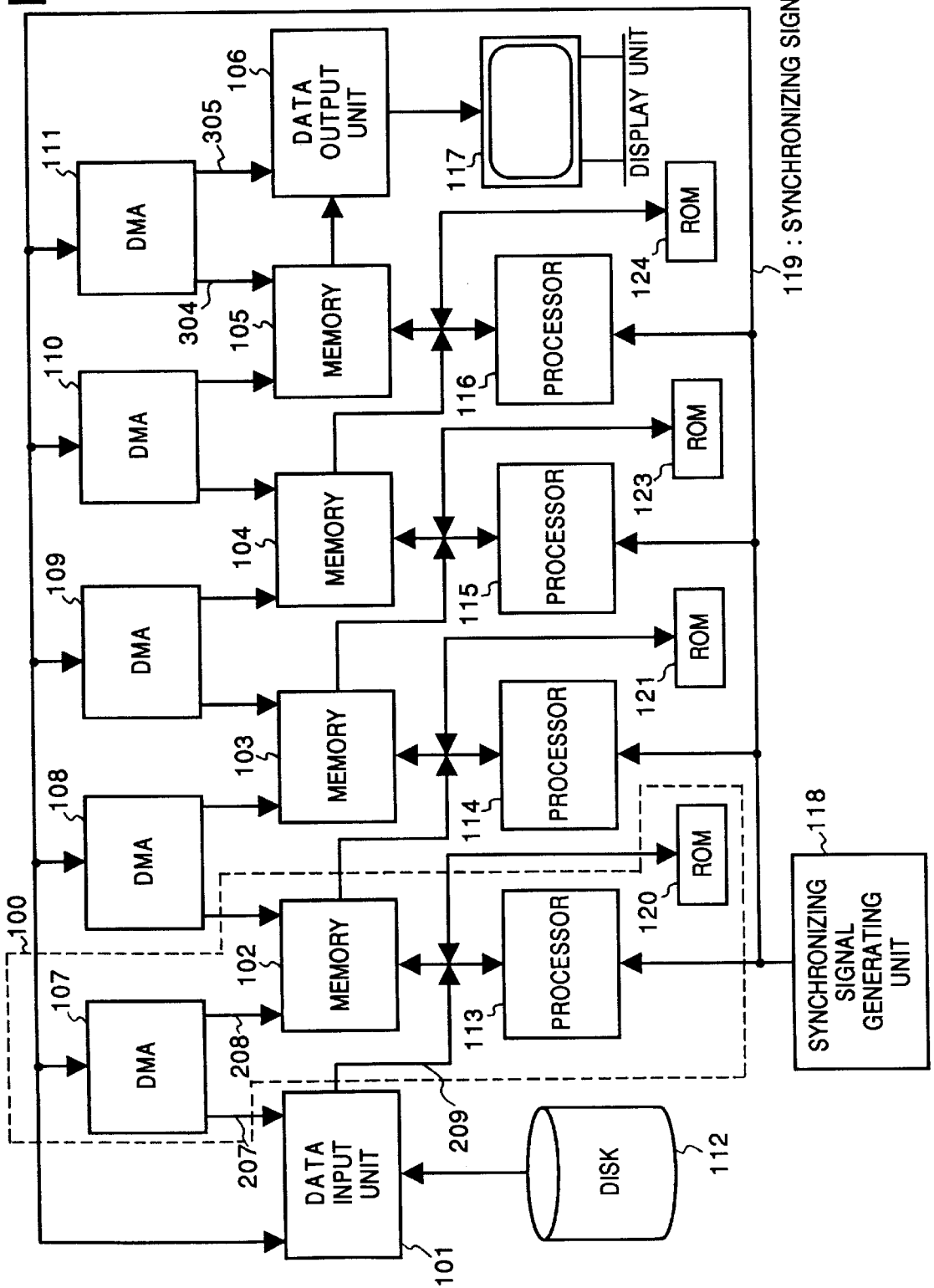
FIG. 1 is a block diagram showing the configuration of a multi-processor system according to a first embodiment of the present invention.

FIG. 1 shows the configuration of the multiprocessor system of the first embodiment. In FIG. 1, a data input unit 101 inputs data into the system using a disk 112 as a data input source. Note that the data input source is not limited to the disk, but it may be any other sources than a disk or a network.

Four processors 113 to 116 independently access memories 102 to 105.

A data output unit 106 is a video memory connected to a display unit 117. Note that the output unit is not limited to the video memory, but it may be any other device such as a hard disk.

A synchronizing signal generator 118 generates a synchronizing signal at intervals of 1/30 sec. Note that this period is not limited to 1/30 sec, but it may be freely set.

The synchronizing signal enters the processors 113 to 116, and the data input unit 101, DMA's (direct memory access controllers) 107 to 111.

Note that a DMA, a memory, a processor and a ROM form one processing unit. In FIG. 1, the system has four processing units including a processing unit 100.

Figure 2:
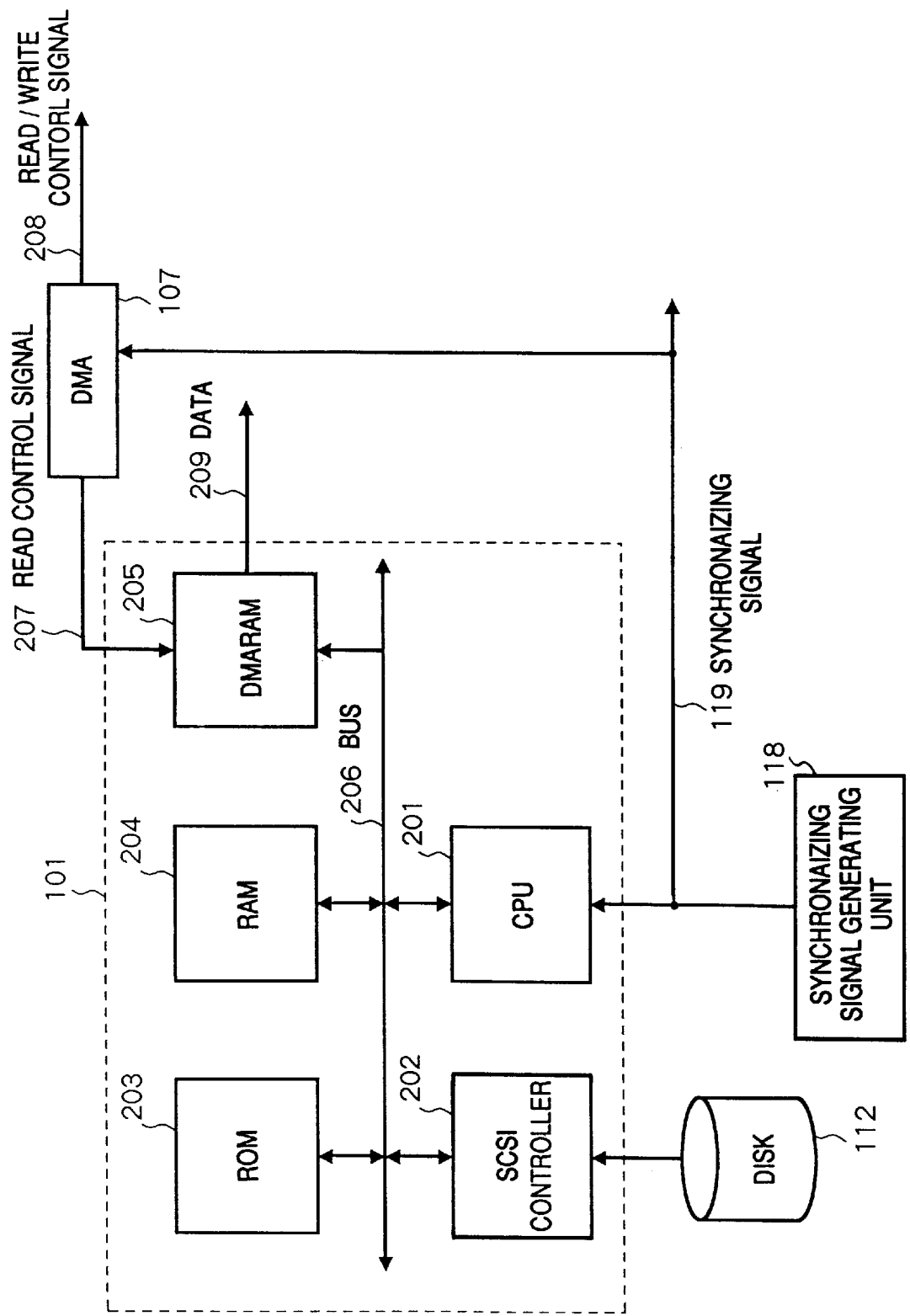
FIG. 2 is a block diagram showing the configuration of a data input unit in FIG. 1.

FIG. 2 shows the configuration of the data input unit 101. A processor 201, for controlling the data input unit 101, uses a RAM 204 as a work area by a program stored in a ROM 203, controls an SCSI controller 202, and transfers data read out from the disk 112 to a DMARAM 205 via a bus 206.

The DMARAM 205 has a dual port configuration. The CPU 201 can access an arbitrary address of the DMARAM 205. In this embodiment, a dual port video memory is used as DMARAM 205, however, the configuration of this memory is not limited to the one in this figure.

The DMA 107 outputs a read control signal 207 to the DMARAM 205 in synchronization with a synchronizing signal 119, and outputs a read/write control signal 208 for writing data 209 outputted from the DMARAM 205 into the memory 102.

Figure 3:
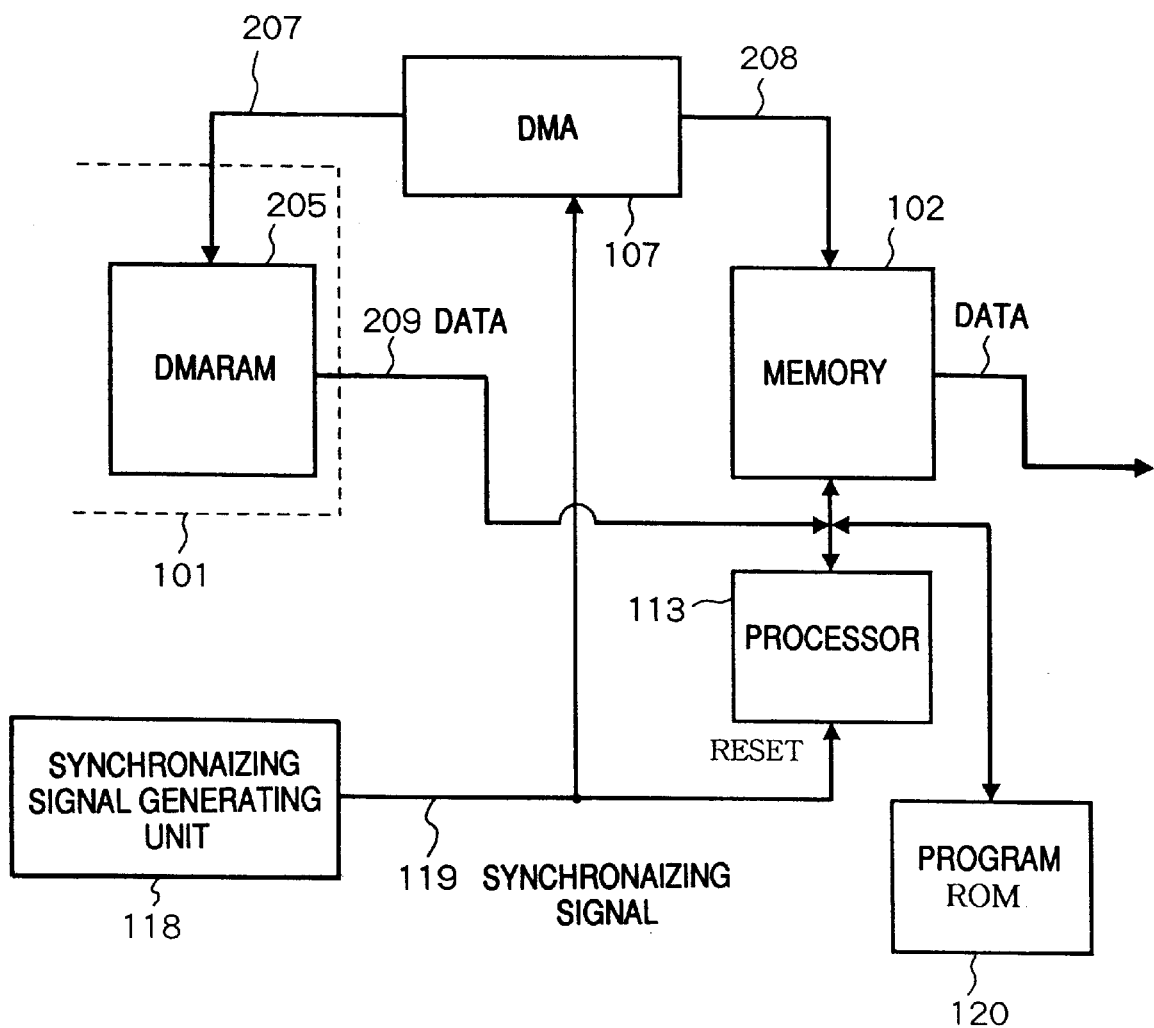
FIG. 3 is a block diagram showing the configuration of a processor in FIG. 1.

FIG. 3 shows the configuration of the processor and the memory as the processing unit. Though FIG. 3 only shows the memory 102 and the processor 113, the other three processing units have the same configuration. The memory 102 has a dual port configuration where two ports are respectively a random port for access from the DMA 107 and a read port for outputting data to the memory 103.

The processor 113 performs processing upon data stored in the memory 102 under the control of the program stored in a program ROM 120 and the synchronizing signal 119 connected to the reset terminal.

Note that the configuration of the processing units regarding the processors 114 to 116 are the same as the above described configuration of the processing unit including the processor 113, the memory 102, the program ROM 120, and the DMA 107.

Figure 4:
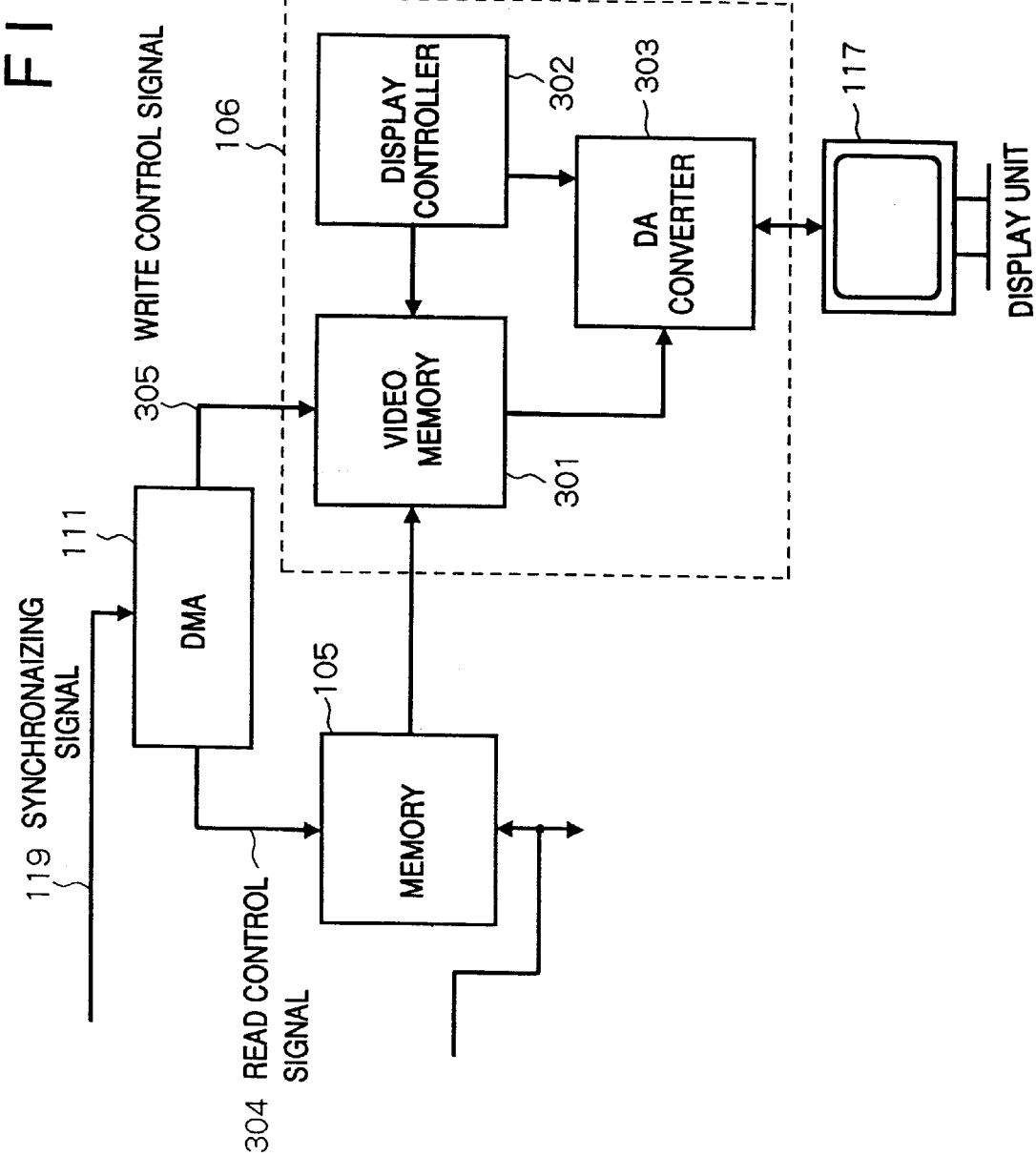
FIG. 4 is a block diagram showing a data output unit in FIG. 1.

FIG. 4 shows the configuration of the output unit 106. Note that a video memory 301 consists of general video RAM chips.

The DMA 111 inputs data outputted from the memory 105 into the random access port of the video memory 301 in synchronization with the synchronizing signal 119. At the same time, the DMA 111 generates a write control signal 305 and inputs the signal into the video memory 301.

A display controller 302 generates a control signal for data output from the serial port of the video memory 301 and a synchronizing signal for the display unit 117 as is done in minor-art. A D/A converter 303 converts the output data from the video memory 301 into an analog signal to the display unit 117. This is also a prior art.

FIG. 5 shows the timing of the synchronizing signal 119.

In FIG. 5, the synchronizing period is 1 sec/30 frames., i.e. 33 ms. In each period, the initial 10 ms is used as a transfer period where the synchronizing signal is maintained at a low level. The following 23 ms is a data processing period where the synchronizing signal is maintained at a high level. The synchronizing signal of this cycle is continuously outputted from the synchronizing signal generating unit 118. These transfer period and processing period can be arranged to different periods according to technologies used.

Figure 6A:
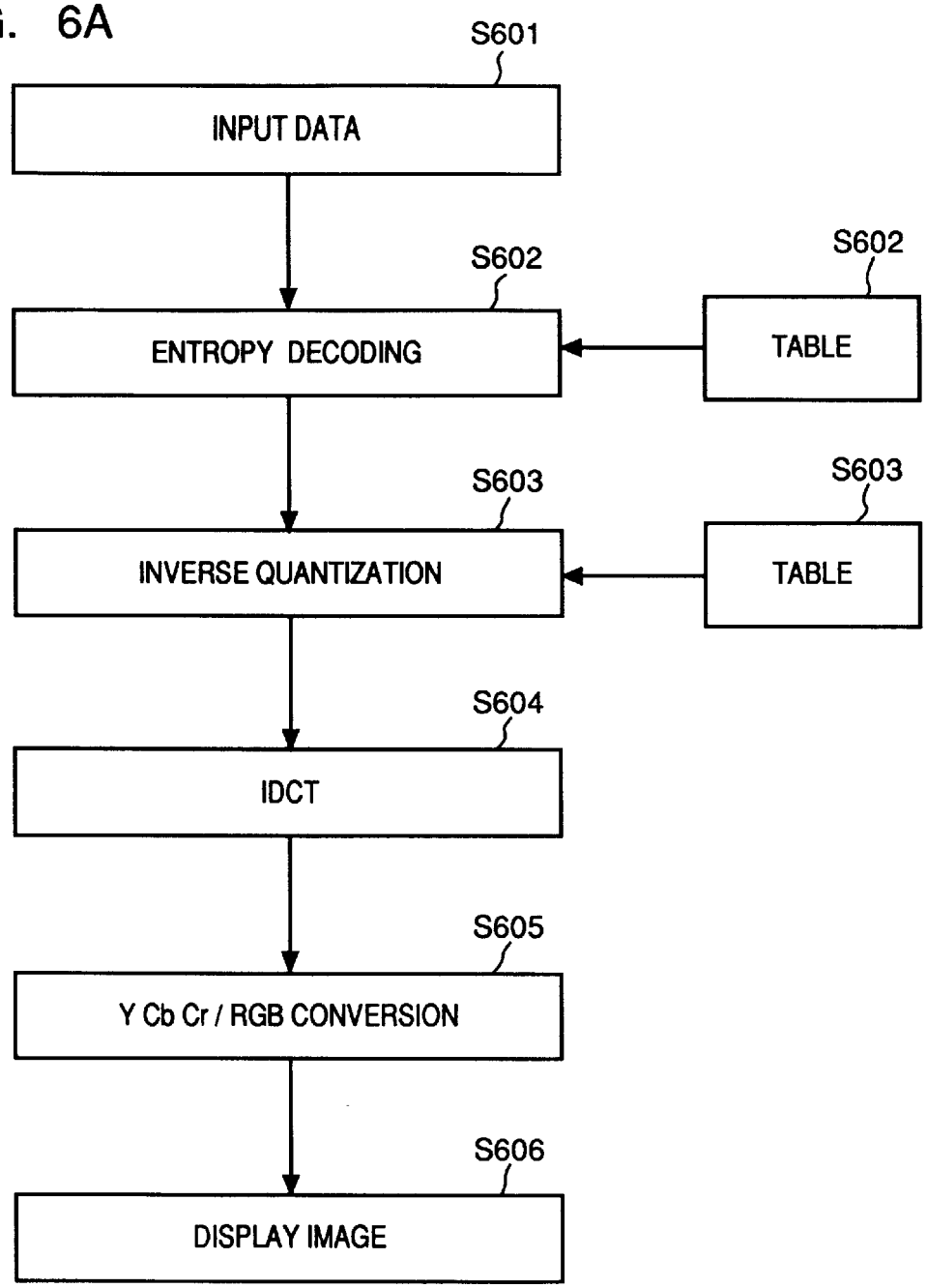
FIG. 6A is a flowchart showing an algorithm for expanding compressed image data according to the JPEG Recommendations.

FIG. 6A is a flowchart of expanding compressed data according to the well-known JPEG Recommendations. The expanding operation will be described in detail with reference to the flowchart in FIG. 6B. Note that the present system inputs the image data compressed based on the JPEG procedure from the data input unit 101, performs reproduction processing upon the input data, and outputs the data from the data output unit 106.

FIG. 7 illustrates the processing. For example, in period pp0, the data input unit 101 processes frame 1 data; in period tp1, the data input unit 101 transfers the data to the memory 102; and in period pp1, the processor 113 processes the frame 1 data stored in the memory 102, and the data input unit 101 reads frame 2 data. Note that period tp represents a data transfer period, and period pp, a data processing period. Hereinafter, the respective periods will be discriminated by these references.

<Processing Procedure>

Data 601 (FIGS. 6A and 6B) is compressed image data corresponding to one image frame. This data includes header information, table information for reconstructing the table used for compression and compressed data. The image data is based on the NTSC specifications, and it includes Y, Cr and Cb color component data. Note that the steps correspond to FIG. 6A are shown in parenthesis.

(1) Processing Period pp0

When the system in FIG. 1 starts to operate, in the data input unit 101, the CPU 201 controls the SCSI controller 202 to transfer frame 1 data stored in the disk 112 to a predetermined position of the DMARAM 205 during the period pp0 where the synchronizing signal 119 is indicative of data processing time. This process corresponds to step S601 of FIG. 6A.

(2) Transfer Period tp1

In the subsequent transfer period tp1, the DMA 107 outputs a read signal to the DMARAM 205 for reading the data block stored at the predetermined position of the DMARAM 205. At the same time, the DMA 107 outputs a write signal to the memory 102 for writing the data block at a predetermined position of the memory 102. This method is generally used in DMA transfers. To avoid data conflict in a data transfer period, the synchronizing signal 119 is connected to the reset terminals of the processors 113 to 116.

(3) Processing Period pp1

In data transfer period pp1, the data input unit 101 reads frame 2 data from the disk 112, and writes the data into a predetermined position of the DMARAM 205 (step S601).

At the same time, the processor 113 uses the data transferred to the memory 102 to generate a table 602 (step S602) for perform entropy decoding upon the compressed data. As the system of the present embodiment treats Huffman-coded data, it performs entropy decoding based on the Huffman decoding. Further, the processor 113 writes the entropy-decoded data and the generated table into a predetermined position which is not overlapped with the position used by the DMA 107 in the previous transfer period tp1. Thereafter, the processor 113 goes into idle status and waits for the next transfer period.

(4) Transfer Period tp2

In the subsequent transfer period tp2, the data input unit 101 reads data from the DMARAM 205 by the DMA 107, similar to the previous transfer period tp1, and writes the read data into a predetermined position of the memory 102.

At the same time, the DMA 108 reads the data entropy-decoded by the processor 113 from the memory 102, and writes the data into a predetermined position of the memory 103.

Note that these operations are realized by using dual port video memories as the memories 102 to 105, and by using the random access port for writing and using the serial access port for reading. However, the memory configuration is not limited to that of the present embodiment.

(5) Processing Period pp2

In the subsequent data processing period pp2, the data input unit 101 reads frame 3 data from the disk 112 and writes the read data into a predetermined position of the DMARAM 205 (step S601). At the same time, the processor 113 performs entropy decoding upon the image data (step S602)

At this time, the processor 114 performs inverse quantization (step S603) upon the frame 1 data in the memory 103 in accordance with the program in the program ROM 121. The inverse quantization is re-generating a quantization table 603 used for quantization from the data in the memory 103, and in accordance with this table, re-generating respective AC, DC component data of a luminance signal and a color difference signal. The results of the inverse quantization are written into a predetermined position of the memory 103.

(6) Transfer Period tp3

In the subsequent transfer period tp3, the data input unit 101 reads frame 3 data from the DMARAM 205 by the DMA 107, similar to the previous transfer period tp2, and writes the read data into a predetermined position of the memory 102.

At the same time, the DMA 108 reads the frame 2 data entropy-decoded by the processor 113 from the memory 102, and writes the read data into a predetermined position of the memory 103.

At this time, the DMA 109 reads the frame 1 data inverse-quantized by the processor 114 from the memory 103, and writes the read data into a predetermined position of the memory 104.

(7) Processing Period pp3

In the subsequent data processing period pp3, the data input unit 101 reads frame 4 data from the disk 112 and writes the read data into a predetermined position of the DMARAM 205 (step S601), at the same time, the processor 113 performs entropy decoding upon the frame 3 data in the memory 102 (step S602).

At this time, the processor 114 performs inverse quantization (step S603) upon the frame 2 data in the memory 103.

At the same time, the processor 115 performs inverse discrete cosine transformation (IDCT) (step S604) upon the inverse-quantized frame 1 data in the memory 104 in accordance with a program stored in a ROM 123. As the compressed data in the present embodiment is two-dimensional discrete cosine transformed in 8×8 pixel block units and expressed as one DC coefficient and sixty-three AC coefficients, inverse transformation of the two-dimensional discrete cosine transformation (DCT) is performed. A luminance signal and a color difference signal for one frame resulting from the inverse transformation are written into a predetermined position of the memory 104.

(8) Transfer Period tp4

In the subsequent transfer period tp4, the data input unit 101 reads the frame 4 data from the DMARAM 205 by the DMA 107, similar to the previous transfer period, and writes the read data into a predetermined position of the memory 102.

At the same time, the DMA 108 reads the frame 3 data entropy-decoded by the processor 113 from the memory 102 and writes the read data into a predetermined position of the memory 103.

At this time, the DMA 109 reads the frame 2 data inverse-quantized by the processor 114 from the memory 103, and writes the read data into a predetermined position of the memory 104.

At the same time, the DMA 110 reads the frame 1 data inverse discrete cosine transformed by the processor 114 from the memory 104, and writes the read data into a predetermined position of the memory 105.

(9) Processing Period pp4

In the subsequent data processing period pp4, the data input unit 101 reads frame 5 data from the disk 112 and writes the read data into a predetermined position of the DMARAM 205 (step S601). At the same time, the processor 113 performs entropy decoding (step S602) upon the frame 4 data, and at this time, the processor 114 performs inverse quantization (step S603) upon the frame 3 data in the memory 103.

At the same time, the processor 115 performs inverse discrete cosine transformation (IDCT) (step S604) upon the frame 2 data in the memory 104.

At this time, the processor 116 converts the y, Cb and Cr data in the memory 105 into R, G and B signals for displaying an image on a bitmap display, in accordance with a program stored in a ROM 124 (step S605). This conversion is made by:

$R = Y + 1.40200 \times Cr$ $G = Y - 0.34414 \times Cb - 0.71414 \times Cr$ $B = Y + 1.77200 \times Cb$

(10) Transfer Period tp5

In the subsequent transfer period tp5, the data input unit 101 reads the frame 5 data from the DMARAM 205 by the DMA 107, similar to the previous transfer period, and writes the read data into a predetermined position of the memory 102.

At the same time, the DMA 108 reads the frame 4 data entropy-decoded by the processor 113 from the memory 102, and writes the read data into a predetermined position of the memory 103.

At this time, the DMA 109 reads the frame 3 data inverse-quantized by the processor 114 from the memory 103, and writes the read data into a predetermined position of the memory 104.

At the same time, the DMA 110 reads the frame 2 data inverse discrete cosine transformed by the processor 115 from the memory 104, and writes the read data into a predetermined position of the memory 105.

At this time, the DMA 111 reads the RGB frame 1 data converted by the processor 116 from the memory 105, and writes the read data into the video memory 301 of the data output unit 106.

The data output unit 106 constantly displays-the data read out of the video memory 301 on the display unit 117 via the D/A converter 303 under the control of the display controller 302 (step S606).

As described above, according to the multiprocessor system of the present embodiment, decoding of compressed digital video data can be continuously performed with respect to continuous image frames. This enables expansion of a series of compressed image data in real time.

Note that in this embodiment, the procedure of image processing has been described as decoding the JPEG-based compressed image data, however, as far as the processing is performed in accordance with a stepwise procedure upon a large amount of data, the data is not limited to image data, and the processing is not limited to decoding.

Further, processor units may be added in accordance with the number of necessary steps of processing. Thus, the present invention may be applied to any processing.

[Second Embodiment]

Next, a multi-processor system for reproducing JPEG-based compressed data having a matrix switching network will be described as a second embodiment of the present invention.

Figure 8:
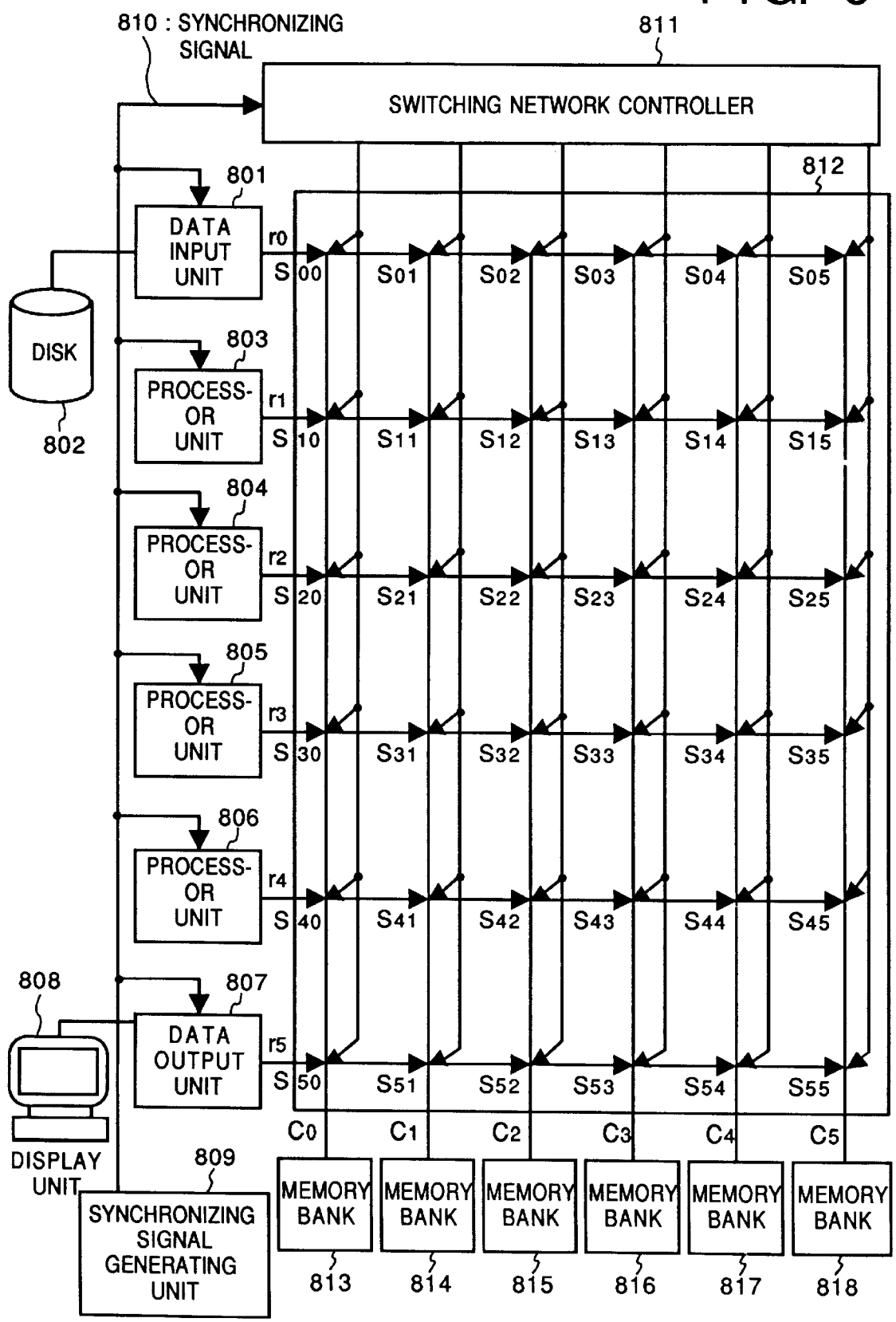
FIG. 8 is a block diagram showing the configuration of a multi-processor system according to a second embodiment of the present invention.

FIG. 8 shows the configuration of the multiprocessor system according to the second embodiment. In FIG. 8, a data input unit 801 reads image data from a disk 802 as a data input medium, and inputs the read data into the main system. This input medium is not limited to the disk, but it may be any other input medium.

Processor units 803 to 806 respectively process data in a corresponding memory in accordance with a program stored in the respective units. A data output unit 807 displays the image data in the memory on a display unit 808. Though the present embodiment uses a display unit as an output medium, the output medium is not limited to the display unit but it may be other output media such as a hard disk.

A switching network controller 811 controls a switching network 812.

Though the present embodiment uses a matrix switching network as the switching network 812, the network is not limited to the matrix switching network but it may be any other network.

Numerals S00 to S55 denote cross point switches which respectively perform connect/disconnect operations by a control signal from the switching network controller 811, to connect the horizontal signal lines r0 to rS, i.e., the input/output signal lines of the data input unit 801, the processor units 803 to 806 and the data output unit 807 with the vertical signal lines c0 to c5, i.e., the input/output signal lines of memory banks 809 to 818. The memory banks 813 to 818 are memory banks independently accessed by the data input unit 801, the respective processor units 803 to 806 and the data output unit 807. In this embodiment, a synchronizing signal generating unit 809 is set to generate a synchronizing signal 810 at each 1/30 sec according to preferred frame rate of JPEG video reproduction. This period, however, is not limited to 1/30 sec., but it can be freely changed to match the requirements for the system.

The synchronizing signal 810 is supplied to the data input unit 801, the processor units 803 to 806, the data output unit 807 and the switching network controller 811.

Figure 9:
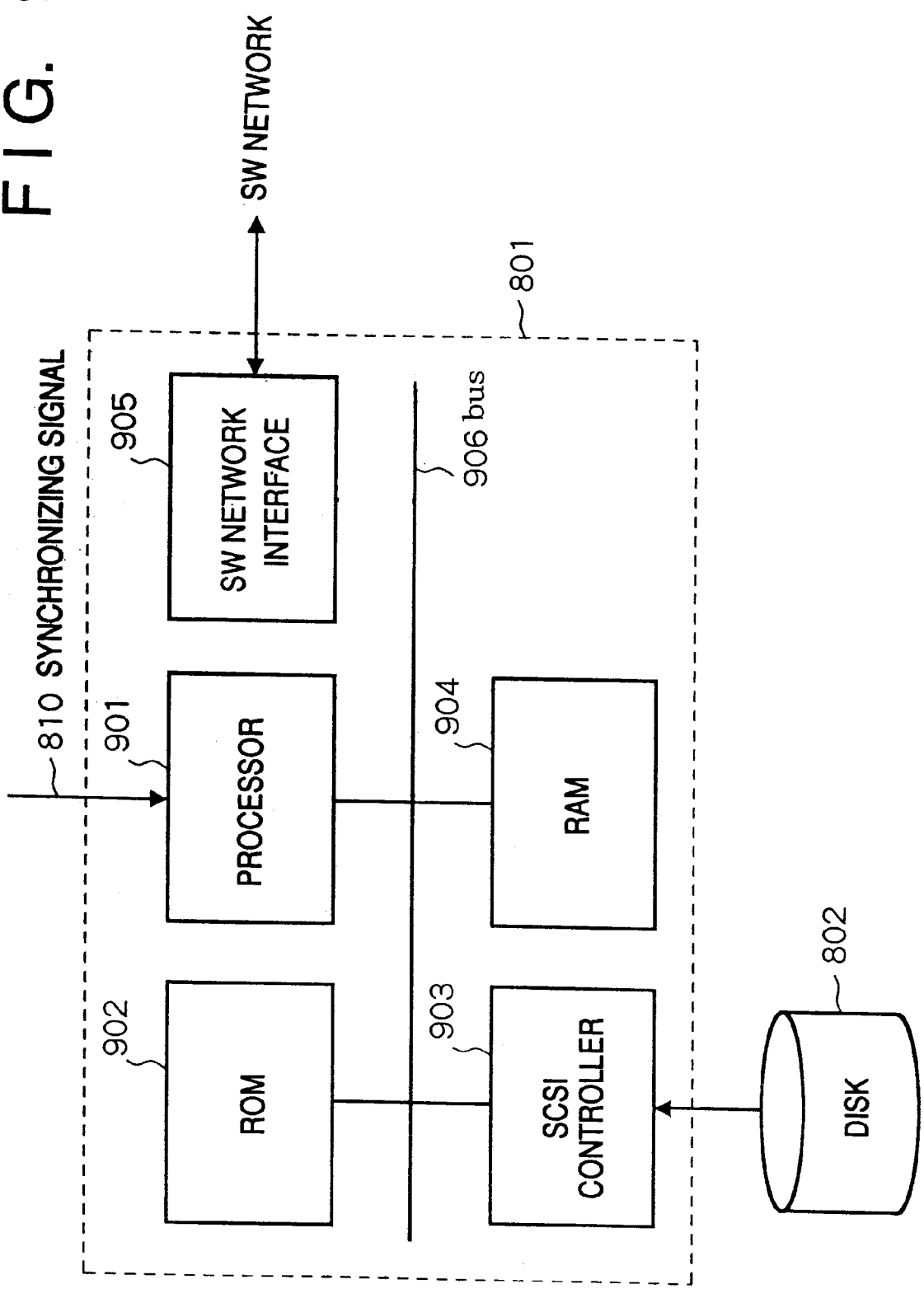
FIG. 9 is a block diagram showing the configuration of a data input unit of FIG. 8.

FIG. 9 shows the configuration of the data input unit 801. A processor 901, for controlling data input, controls an SCSI controller 903 by a program stored in a ROM 902, and transfers data read out from a disk 802 to a RAM 904 via a bus 906. Note that the present embodiment uses the SCSI as an interface between the data input unit 801 and the disk 802. However, the interface is not limited to the SCSI but it may be any other interface.

The processor 901 transfers the data in the RAM 904 to any of the memory banks 813 to 818 via the switching network interface 905 and the switching network 812.

Figure 10:
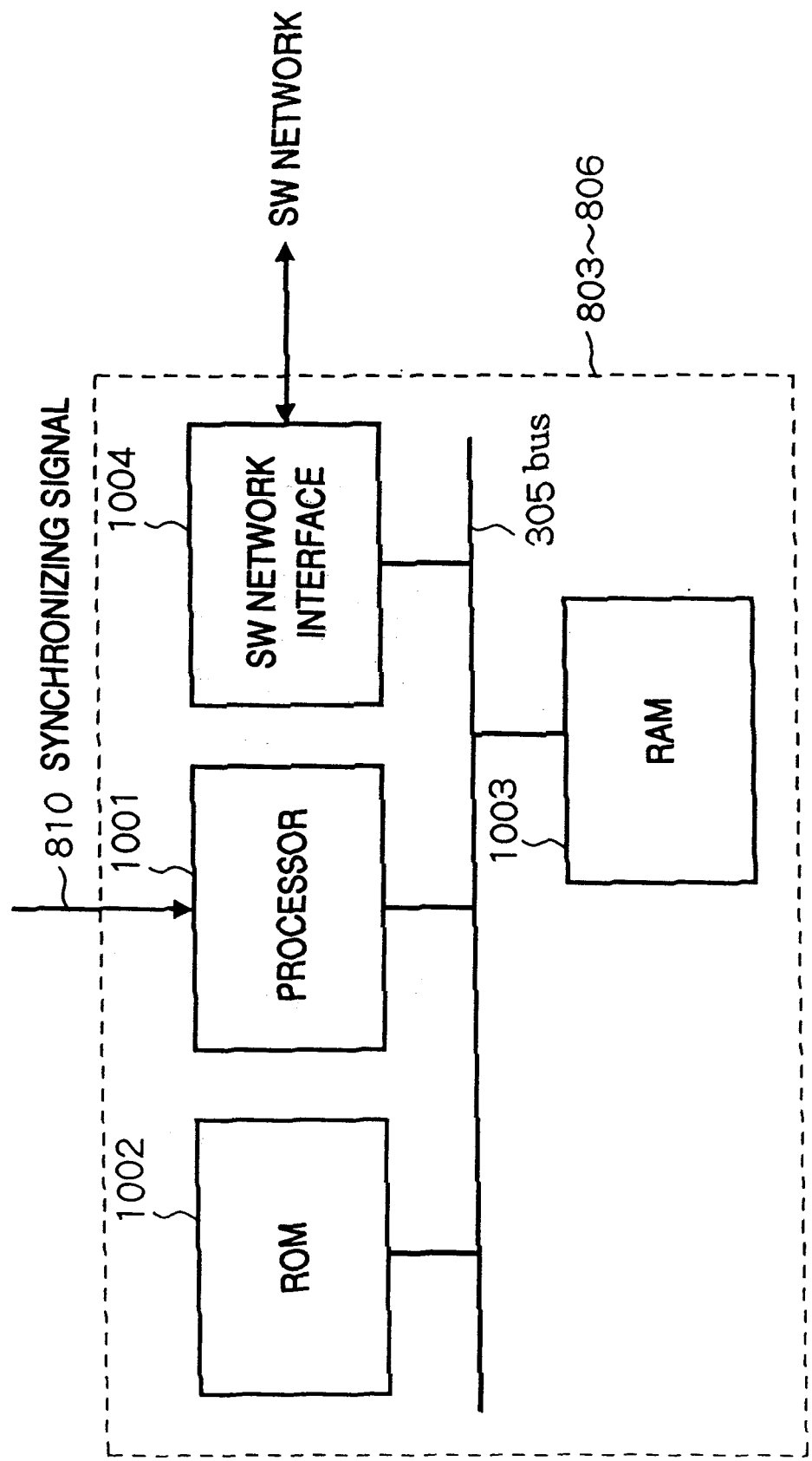
FIG. 10 is a block diagram showing the configuration of a processor unit of FIG. 8.

FIG. 10 shows the construction of the processor units 803 to 806. Note that these processor units have the same configuration. A processor 1001 operates using a RAM 1003 as work space in accordance with a program stored in a ROM 1002. A switching (SW) network interface 1004 operates as an interface between the processor unit and the switching network. The processor 1001 may use any of the memory banks 813 to 818 as work area via the switching network interface 1004 and the switching network 812.

Figure 11:
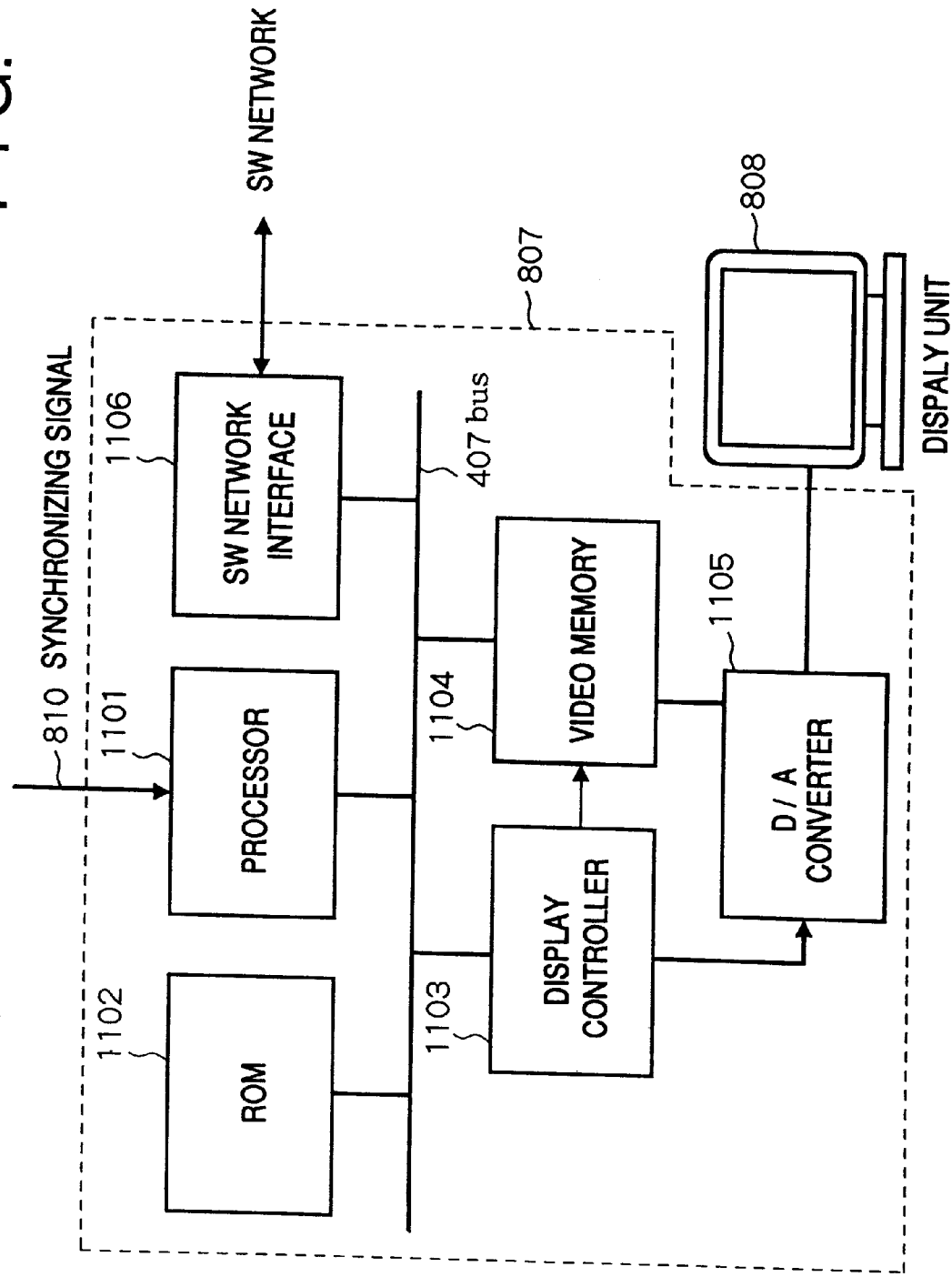
FIG. 11 is a block diagram showing the configuration of a data output unit of FIG. 8.

FIG. 11 shows the configuration of the data output unit 807. A processor 1101, for controlling data output, operates in accordance with a program stored in a ROM 1102. Numeral 1103 denotes a display controller; 1104, a video memory; 1105, a D/A converter; and 1106, an interface between the data output unit 807 and the switching network 812. The processor 1101 reads data from any of the memory banks 813 to 818 via the switching network interface 1106 and the switching network 812 into the video memory 1104, in synchronization with the synchronizing signal 810, and controls the display controller 1103. The display controller 1103 generates a control signal for outputting data from the video memory 1104 and a synchronizing signal for the display unit 808. This is a prior art control method in a graphic system. The D/A converter 1105 converts the digital data in the video memory 104 into an analog signal and outputs the signal to the display unit 808. This is also a prior art.

Figure 12:
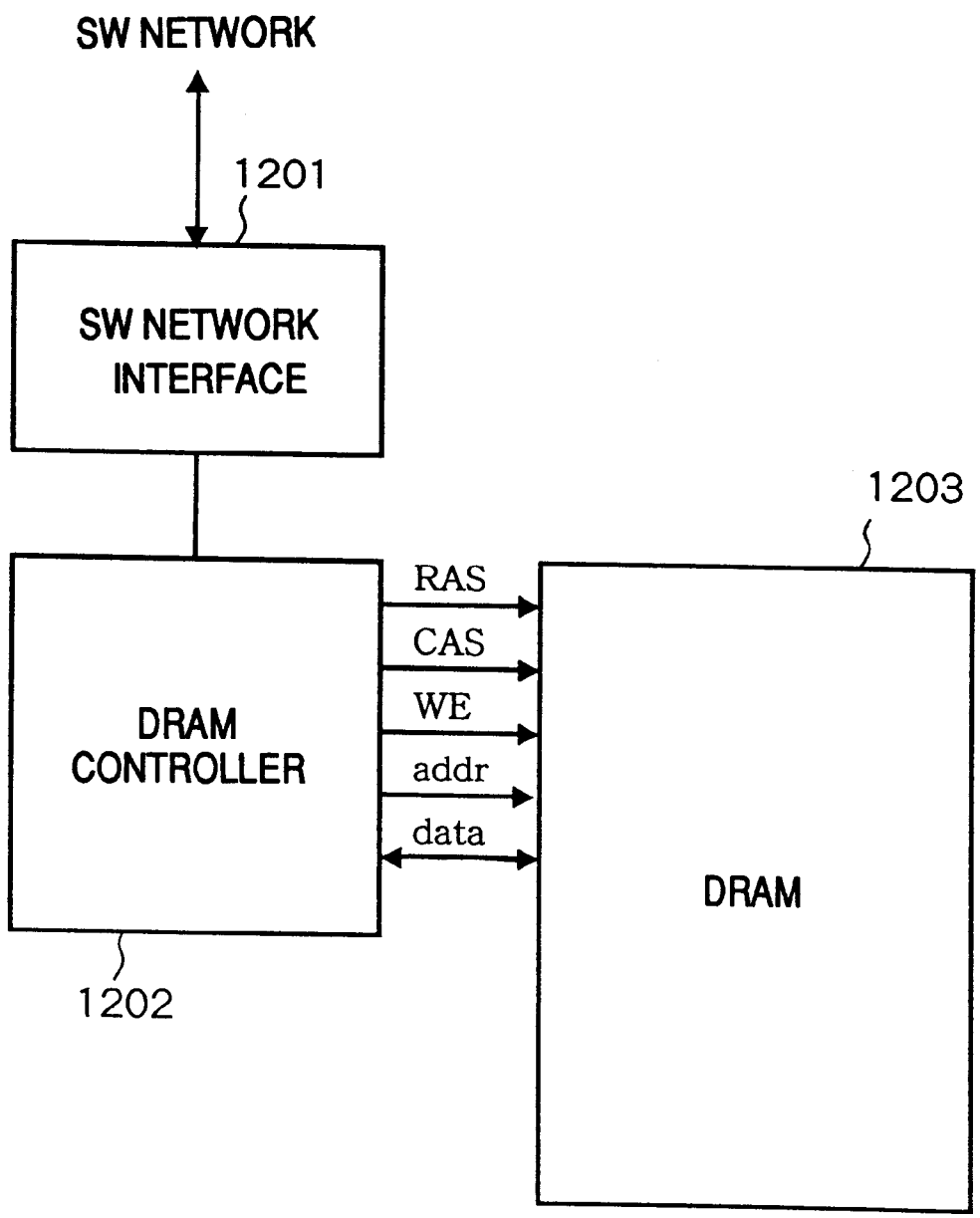
FIG. 12 is a block diagram showing the configuration of a memory bank of FIG. 8.

FIG. 12 shows the configuration of the memory banks 814 to 818. Note that these memory banks have the same configuration. Numeral 1201 denotes an interface between the memory bank and the switching network. A switching network interface 1201 relays memory access requirement from the data input unit 801, the processor units 803 to 806 and the data output unit 807 via the switching network 812 to a DRAM controller 1202. The DRAM controller 1202 interprets the memory access requirement and performs data reading/writing to a DRAM 1203 or a DRAM refreshment operation in accordance with DRAM control signals such as RAS, CAS, WE and an address signal. This DRAM control method is a well known control method. Note that the present embodiment uses the DRAM as a memory device, however, the memory device is not limited to the DRAM, but any other memory device such as SRAM can be used.

Figure 13:
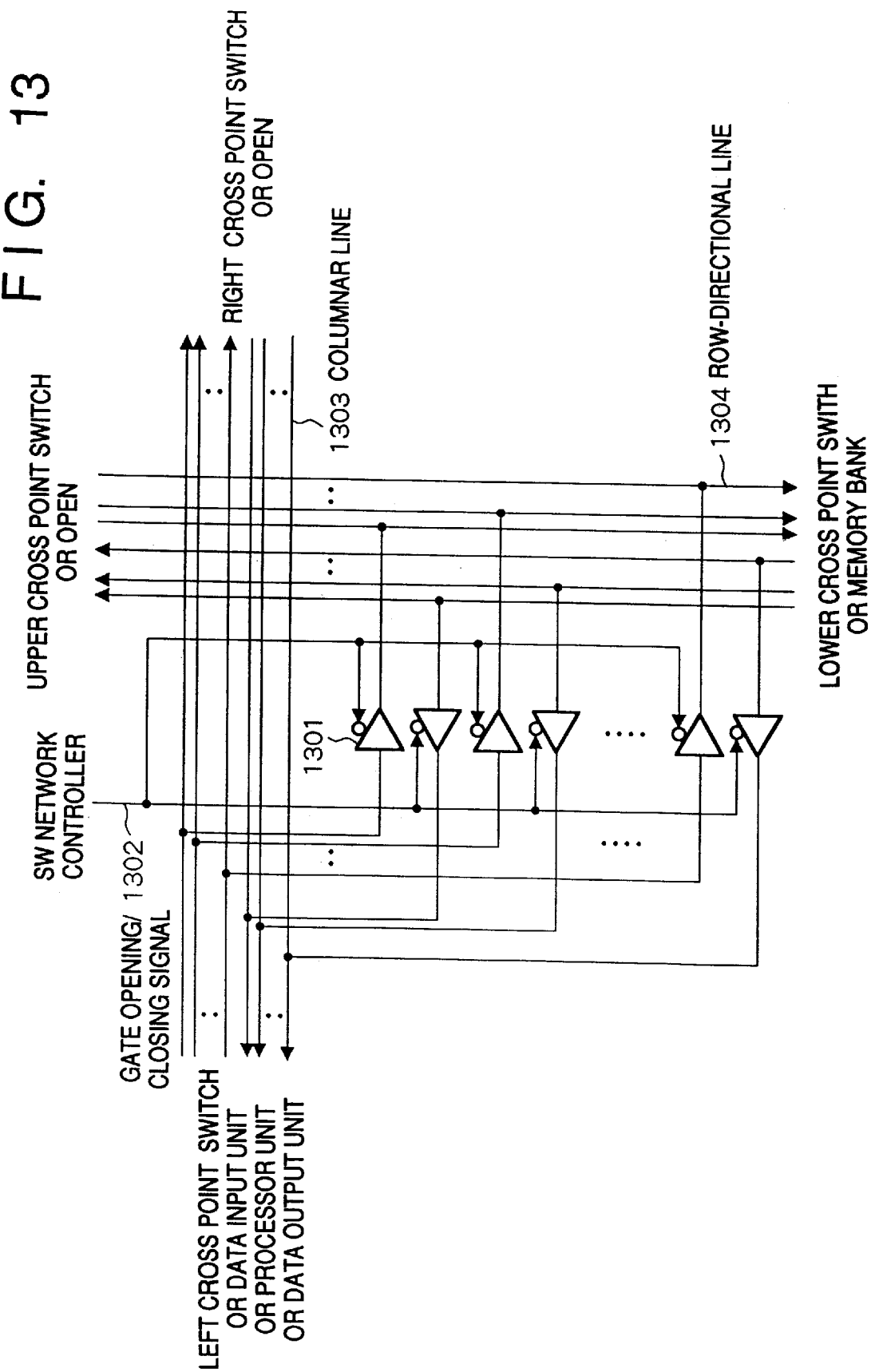
FIG. 13 is a block diagram showing the configuration of a cross point switch.

FIG. 13 shows the configuration of the cross point switch of the matrix switching network as the switching device of the present embodiment. Although each switch, when turned on, connects to a different set of system components, all the cross point switches S00 to S55 have the same configuration. Numeral 1301 denotes a cross point switching device consisting of a three-state gate. Because this embodiment has a bi-directional data path, the respective cross point switches have twice the number of gates of the data bus width (number of bits) between the data input unit 801, the respective processor units 803 to 806, the data output unit 807 and the respective memory banks 813 to 818. The respective gates perform connect/disconnect operations for connection between a columnar line 1303, connected to the data input unit 80, the respective processor units 803 to 806 and the data output unit 807; and a row-directional line 1304, connected to the respective memory banks 813 to 818, under the control of a gate connect/disconnect signal 1302 outputted from the switching network controller 811.

Figure 14:
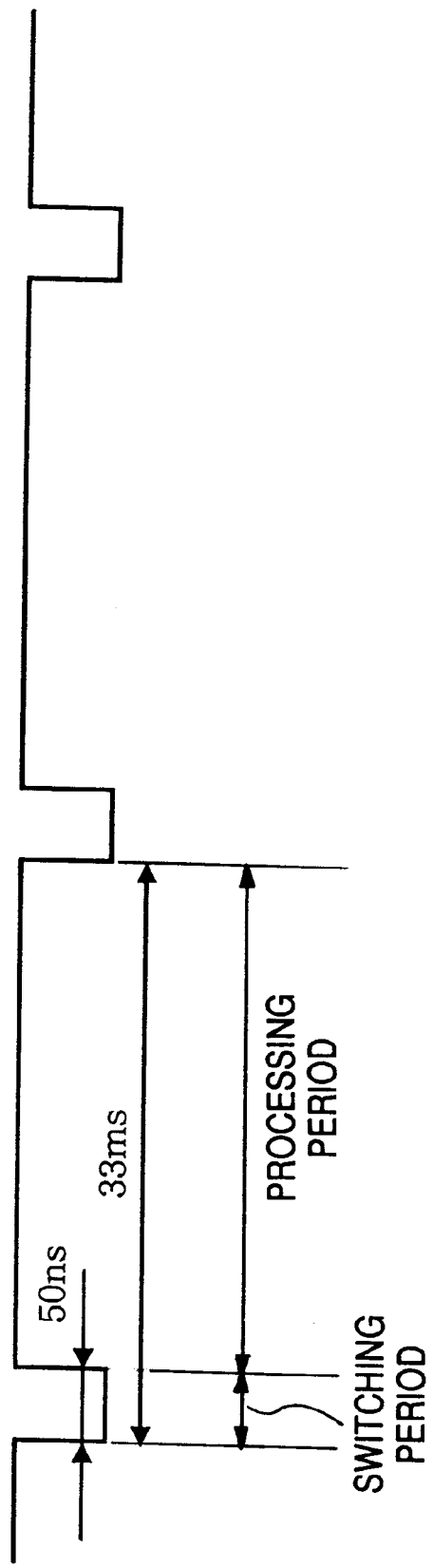
FIG. 14 is a timing chart showing the timing of a synchronizing signal.

FIG. 14 is a timing chart showing the timing of the synchronizing signal outputted from the synchronizing signal generating unit 809 onto the synchronizing signal line 810. Similar to the first embodiment, the synchronizing period is 1/30 sec, i.e. 33 ms. The synchronizing signal generating unit 809 continuously outputs the synchronizing signal with repeating cycle which is divided into an initial 50 ns where the synchronizing signal is at a low level and the rest of the cycle where the signal is at a high level. As described in the first embodiment, this cycle can be freely set, and other settings such as duty can be freely set. Hereinafter, the 50 ns low level period will be referred to as a switching period and the rest high level period, as a processing period.

Next, the operation of the multi-processor system having the above configuration for reproducing JPEG-based compressed data in accordance with the procedure of the first embodiment as shown in FIG. 6 will be described below. Note that the compressing method is well known as an image compressing method, and the processing is not limited to the present embodiment.

<Decoding of Image Data>

Figure 6B:
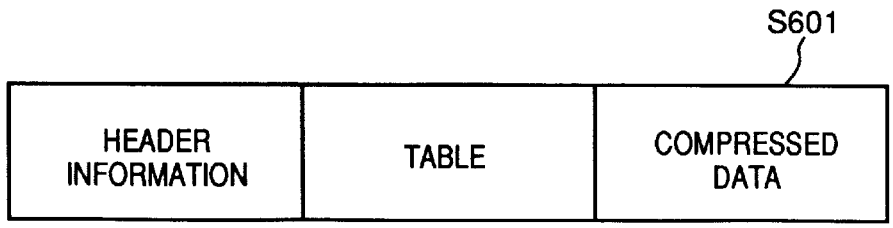
FIG. 6B is a data format of compressed data.

FIG. 6A shows a flow chart of decoding process for compressed data and FIG. 6B shows a sample of compressed data.

In FIG. 6B, numeral 601 denotes a format of compressed image data. The image data includes header information and table information for regenerating a table used upon compressing and compressed data. The compressed data is decoded by the following processing.

Figures 15, 16:
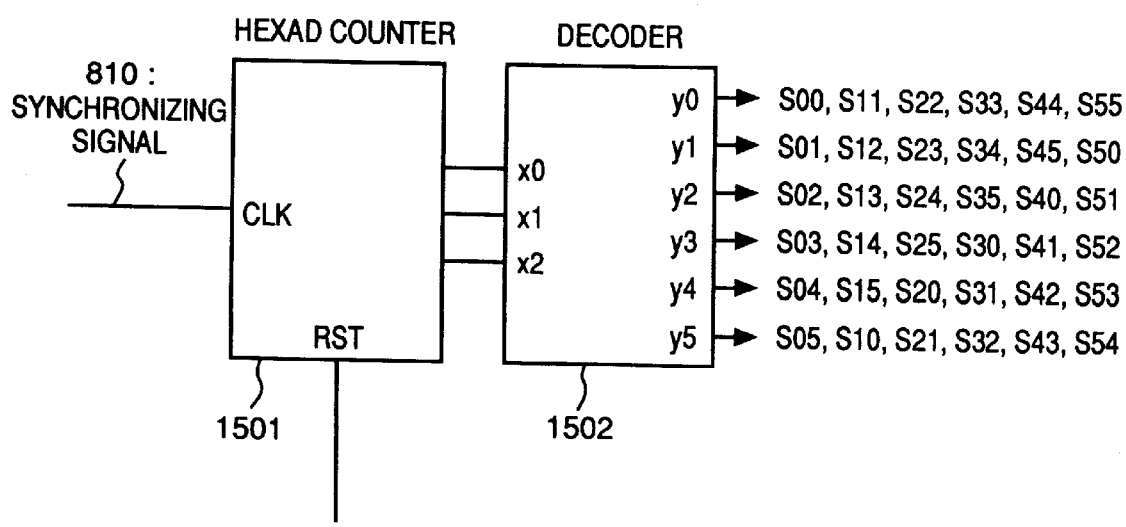
FIG. 15 illustrates a table showing the connection between respective processing units and the memory banks.
FIG. 16 is a block diagram showing the configuration of a switching network controller of FIG. 8.

FIG. 15 illustrates the connection of the data input unit 801, the processor units 803 to 806 and the data output unit 807 with the memory banks 813 to 818. In FIG. 15, numerals p0 to p6 respectively denote a period of the synchronizing signal shown in FIG. 14. Abbreviation MB stands for a memory bank. For example, in period p0, the data input unit 801 is connected to the memory bank 813, and the data output unit 807 is connected to the memory bank 818. Hereinafter, the operation of the multi-processor system of the present embodiment will be described with reference to FIG. 6A, 6B, and FIGS. 8 to 15.

When the system starts to operate, in the initial switching period, the synchronizing signal 810 is turned to a low level, and at the same time, the processor 901 of the data input unit 801 controls the SCSI controller 903 in accordance with the program stored in the ROM 902 to transfer one frame of compressed image data stored in the disk 802 in the format 601 to the RAM 904.

(1) Period p0

In the subsequent period p0, as the synchronizing signal 810 is to the low level, the switching network controller 811 opens the gate 1301 of the cross points S00, S11, S22, S33, S44 and S55, and closes the gate 1301 of the other cross points by the gate connect/disconnect signal 602, thus establishes the path between the data input unit 801 and the memory bank 813, the path between the processor unit 803 and the memory bank 814, the path between the processor unit 804 and the memory bank 816, the path between the processor unit 806 and the memory bank 817, and the path between the data output unit 807 and the memory bank 818.

The processor 901 of the data input unit 801 transfers one frame of the compressed data in the RAM 904, stored in the previous period p0, to the memory bank 813 via the switching network interface 905 and the switching network 812, in accordance with a program stored in the ROM 902 (step S601). At this time, the processor 901 of the data input unit 801 does not need to explicitly specify one of the memory banks 813 to 818 as the destination of the data transfer. The processor 901 can merely transfer the data to the memory bank at the opposite end of the path established by the switching network controller 811.

The processor 901 of the data input unit 801 controls the SCSI controller 903 in accordance with the program stored in the ROM 902, to transfer compressed data for the next one frame stored in the disk 802 to the RAM 904. Hereinafter, in each period, the data input unit 801 repeats this operation by the completion of the processing. Note that in this period, the processor units 803 to 806 and the data output unit 807 respectively access the memory banks at the opposite ends of the paths established by the switching network controller 811, however, as there is no valid data, no processing is performed.

(2) Period p1

In the subsequent period p1, as the synchronizing signal 810 is turned to the low level, the switching network controller 811 opens the gate 1301 of the cross points S10, S21, S32, S43, S54 and S05 and closes the gate 1301 of the other cross points by the gate connect/disconnect signal, thus establish the path between the data input unit 801 and the memory bank 818, the path between the processor unit 803 and the memory bank 813, the path between the processor unit 804 and the memory bank 814, the path between the processor unit 805 and the memory bank 815, the path between the processor unit 806 and the memory bank 816, and the path between the data output unit 807 and the memory bank 817.

The data input unit 801 transfers the compressed data for one frame, read out of the disk 802 in the previous period p0, to the memory bank 818, and reads compressed data for the next frame from the disk 802 (step S601).

In the processor unit 803, the processor 1001 reads the compressed data for one frame, transferred by the data input unit 801 in the previous period p0, from the memory bank 813 to the RAM 1003 via the switching network interface 1004 and the switching network 812, in accordance with a program stored in the ROM 302. Then, the processor 1001 generates the table 603 for entropy decoding and performs entropy decoding upon the image data (step S602). As the present embodiment treats Huffman-coded data, the entropy decoding is based on the Huffman decoding. The processor 1001 of the processor unit 803 transfers the entropy-decoded data and the table from the RAM 1003 to the memory bank 813 via the switching network interface 1004 and the switching network 812. Upon data transfer, the processor 1001 does not need to explicitly specify one of the memory banks 813 to 818 as the destination of the data transfer, but it can merely transfer the data to the memory bank at the opposite end of the path established by the switching network controller 811.

Hereinafter, in each period, the processor unit 803 repeats this operation by the completion of the processing. Note that in this period p1, the processor units 804 to 806 and the data output unit 807 respectively access the memory banks at the opposite ends of the paths established by the switching network controller 811, however, there is no valid data and no processing is performed.

(3) Period p2

In the subsequent period p2, as the synchronizing signal 810 is turned to the low level, the switching network controller 811 opens the gate 1301 of the cross points S20, S31, S42, S53, S04 and S15, and closes the gate 1301 of the other cross points by the gate connect/disconnect signal 1302, thus establishes the path between the data input unit 801 and the memory bank 817, the path between the processor unit 803 and the memory bank 818, the path between the processor unit 804 and the memory bank 813, the path between the processor unit 805 and the memory bank 814, the path between the processor unit 806 and the memory bank 815, and the path between the data output unit 807 and the memory bank 816.

The data input unit 801 transfers the compressed data for one frame, read from the disk 802 in the previous period p1, to the memory bank 817, and reads compressed data for the next frame from the disk 802 (step S601).

The processor unit 803 reads the compressed data for one frame from the memory bank 818, performs entropy decoding upon the data (step S602), and transfers the entropy-decoded data and the table to the memory bank 818.

In the processor unit 804, the processor 1001 reads the entropy-decoded data and the table transferred by the processor unit 803 in the previous period from the memory bank 813 into the RAM 1003 via the switching network interface 1004 and the switching network 812, in accordance with the program stored in the ROM 1002, then performs inverse quantization upon the read data (step S603). The inverse quantization is done by regenerating a quantization table 605 used in the quantization from the data in the RAM 1003, and in accordance with this table, regenerating respective AC/DC components of the luminance signal and the color difference signal. The regenerated AC/DC components are transferred from the RAM 1003 to the memory bank 813 via the switching network interface 1004 and the switching network 812. Upon data transfer, the processor 1001 of the processor unit 804 does not need to explicitly specify one of the memory banks 813 to 818 as the transfer destination, but it can merely transfer the data to the bank at the opposite end of the path established by the switching network controller 811.

Hereinafter, in each period, the processor unit 804 repeats this operation by the completion of the processing. In this period p2, the processor units 805 and 806, the data output unit 807 access the memory banks at the opposite ends of the paths established by the switching network controller 811, however, there is no valid data and no processing is performed.

(4) Period p3

In the subsequent period p3, as the synchronizing signal 810 is turned to the low level, the switching network controller 811 opens the gate 1301 of the cross points S30, S41, S52, S03, S14 and S25, and closes the gate 1301 of the other cross points by the gate connect/disconnect signal 1302, to establish the path between the data input unit 801 and the memory bank 816, the path between the processor unit 803 and the memory bank 817, the path between the processor unit 804 and the memory bank 818, the path between the processor unit 805 and the memory bank 813, and path between the processor unit 806 and the memory bank 814, and the path between the data output unit 807 and the memory bank 815.

The data input unit 801 transfers the compressed data for one frame, read from the disk 802 in the previous period p2, to the memory bank 816, and reads compressed data for the next frame from the disk 802 (step S601).

The processor unit 803 reads the compressed data from the memory bank 817, perform entropy decoding upon the data (step S602), and transfers the entropy-decoded data and the table to the memory bank 817.

The processor unit 804 reads the entropy-decoded data and the table from the memory bank 818, performs inverse quantization by regenerating the AC/DC components of a luminance/color difference signal (step S603), and transfers the resultant AC/DC components to the memory bank 818.

The processor unit 805 reads the AC/DC components, transferred by the processor unit 804 in the previous period, from the memory bank 813 to the RAM 1003 via the switching network interface 1004 and the switching network 812, in accordance with the program stored in the ROM 1002, then performs inverse discrete cosine transformation (step S604). In the present embodiment, as the compressed data is two-dimensional discrete cosine transformed in 8×8 pixel block units and expressed as one DC coefficient and three AC coefficients, inverse transformation of the two-dimensional discrete cosine transformation is performed. The resulting luminance signal and color difference signal for one image frame are transferred from the RAM 1003 to the memory bank 813 via the switching network interface 1004 and the switching network 812. Upon data transfer, the processor 1001 of the processor unit 805 does not need to explicitly specify one of the memory banks 813 to 818 as the transfer destination, but it can merely transfer the data to the memory bank at the opposite end of the path established by the switching network controller 811.

Hereinafter, in each period, the processor unit 805 repeats this operation by the completion of the processing. In this period p3, the processor unit 806 and the data output unit 807 respectively access the banks at the opposite ends of the paths established by the switching network controller 811, however, there is no valid data and no processing is performed.

(5) Period p4

In the subsequent period p4, as the synchronizing signal 810 is turned to the low level, the switching network controller 811 opens the gate 1301 of the cross points S40, S51, S02, S13, S24 and S35, and closes the gate 1301 of the other cross points by the gate connect/disconnect signal 1302, thus establishes the path between the data input unit 801 and the memory bank 815, the path between the processor unit 803 and the memory bank 816, the path between the processor unit 804 and the memory bank 817, the path between the processor unit 805 and the memory bank 818, the path between the processor unit 806 and the memory bank 813, and the path between the output unit 807 and the memory bank 814.

The data input unit 801 transfers the compressed data for one frame, read from the disk 802 in the previous period p3, to the memory bank 815, and reads compressed data for the next frame from the disk 802 (step S601).

The processor unit 803 reads the compressed data for one frame from the memory bank 816, performs entropy decoding upon the data (step S602), and transfers the entropy-decoded data and the table to the memory bank 816.

The processor unit 804 reads the entropy-decoded data and the table from the memory bank 817, performs inverse quantization by regenerating the AC/DC components of luminance and color difference signals (step S603), and transfers the AC/DC components to the memory bank 817.

The processor unit 805 reads the AC/DC components from the memory bank 818, performs inverse discrete cosine transformation upon the components (step S604), and the resulting luminance signal and color difference signal to the memory bank 818.

The processor unit 806 reads the luminance signal and the color component signal for one frame, transferred by the processor unit 805 in the previous period p3, to the memory bank 813 via the switching network interface 1004 and the switching network 812, in accordance with the program stored in the ROM 1002, to perform conversion upon the signals into R, G and B signals for displaying an image on the bitmap display (step S605). The obtained R, G and B signals are transferred from the RAM 1003 to the memory bank 813 via the switching network interface 1004 and the switching network 812. Upon data transfer, the processor 1001 of the processor unit 806 does not need to explicitly specify one of the memory banks 813 to 818 as the transfer destination, but it can merely transfer the data to the bank at the opposite end of the path established by the switching network controller 811.

Hereinafter, in each period, the processor unit 806 repeats this operation by the completion of the processing. In the period p4, the data output unit 807 accesses the bank at the end of the path established by the switching network controller 811, however, there is no valid data and no processing is performed.

(6) Period 5

In the subsequent period p5, as the synchronizing signal 810 is turned to the low level, the switching network controller 811 opens the gate 1301 of the cross points S50, S01, S12, S23, S34 and S45, and closes the gate 1301 of the other cross points by the gate connect/disconnect signal 1302, to establish the path between the data input unit 801 and the memory bank 814, the path between the processor unit 803 and the memory bank 815; the path between the processor unit 804 and the memory bank 816, the path between the processor unit 805 and the memory bank 817, the path between the processor unit 806 and the memory bank 818, and the path between the data output unit 807 and the memory bank 813.

The data input unit 801 transfers the compressed data for one frame, read out of the disk 802 in the previous period p4, to the memory bank 814, and reads compressed data for the next frame from the disk 802 (step S601). The processor unit 803 reads the compressed data for one frame from the memory bank 815, performs entropy decoding upon the data (step S602), and transfers the entropy-decoded data and the table to the memory bank 815.

The processor unit 804 reads the entropy-decoded data and the table from the memory bank 816, performs inverse quantization by regenerating the AC/DC components of a luminance signal and a color difference signal (step S603), and transfers the regenerated AC/DC components to the memory bank 816.

The processor unit 805 reads the AC/DC components from the memory bank 817, performs inverse discrete cosine transformation upon the data (step S604), and transfers the obtained luminance signal and the color difference signal to the memory bank 817.

The processor unit 806 reads the luminance signal and the color difference signal for one frame from the memory bank 818, converts the signals into R, G and B signals (step S605), and transfers the obtained R, G and B signals to the memory bank 818.

The data output unit 807 reads the R, G and B signals for one frame, transferred by the processor unit 806 in the previous period p4, from the memory bank 813 to the video memory 1104 via the switching network interface 1106 and the switching network 812, in accordance with the program stored in the ROM 1102. At this time, the processor 1101 of the data output unit 807 does not need to explicitly specify one of the memory banks 813 to 818 as the transfer destination, but it can merely access the memory bank at the opposite end of the path established by the switching network controller 811. The data output unit 807 constantly displays data transferred to the video memory 1104 on the display unit 808 via the D/A converter 1105 under the control of the display controller 1103 (step S606) Hereinafter, in each period, the data output unit 807 repeats this operation by the completion of the processing.

As described above, in each period, as the synchronizing signal 810 is turned to the low level, the switching network controller 811 controls the gate 1301 of the respective cross points by the gate connect/disconnect signal 1302, to change the paths between the data input unit 801, the respective processor units 803 to 806, and the data output unit 807, and the respective memory banks 813 to 818. The data output unit 801, the processor units 803 to 806 and the data output unit 807 continuously repeat the respective operations in accordance with corresponding programs. In this manner, the system of the present embodiment can continuously perform a series of processing from expanding compressed image data stored in the disk 802 to displaying an image in actual executing time.

Note that if it is assumed that the switching network controller 811 performs control of the cross point switching in the order of the present embodiment, the switching network controller 811 can be realized with a very simple circuit. FIG. 16 shows an example of the configuration of the switching network controller 811. In FIG. 16, a hexad (modulo-6) automatic counter 1501 inputs the synchronizing signal 810, and repeatedly outputs signals 0 to 5 in synchronization with the synchronizing signal 810. A decoder 1502 inputs the signal values, and sequentially outputs one of signals y0 to y5 as value "1". As shown in FIG. 16, the output signal enters the respective cross point switches as a control signal. Note that the cross point switches are connected when the control signal is "1". Thus, the switching network controller having this simple construction can control the system in FIG. 8.

Further, the switching network controller 811 may be programmed to output a control signal for the cross point switches without any fixed construction as shown in FIG. 16, to freely control the connection between the data input unit/the data output unit/processor units and the memory banks. This can freely change the order of processing.

[Third Embodiment]

Next, a multi-processor system for reproducing JPEG-based compressed data having a wavelength-division-multiplexing switch as a third embodiment of the present invention will be described below.

Figure 17:
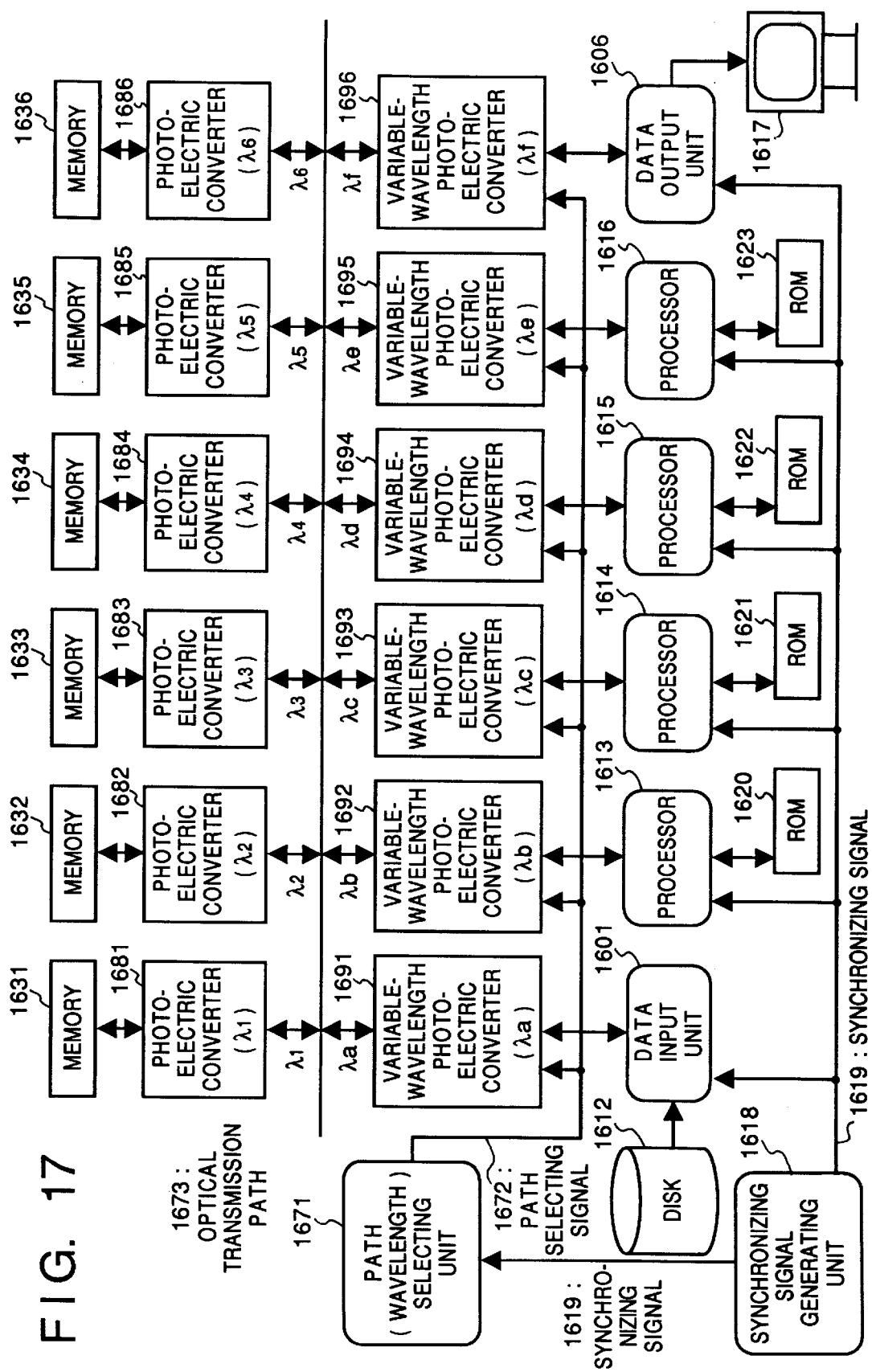
FIG. 17 is a block diagram showing the configuration of an information processing apparatus according to a third embodiment of the present invention.

FIG. 17 shows the configuration of the present embodiment.

In FIG. 17, a data input unit 1601 reads data from the outside of the system. In this embodiment, the system uses a disk 1612 as a data input medium. However, the data input medium is not limited to the disk, but it may be any other device such as a network.

A data output device 1606 is a video memory connected to a display unit 1617. The data output unit is not limited to the video memory, but it may be any other device such as a hard disk. Memories 1631 to 1636 are independently accessed by processors 1613 to 1616, the data input unit 1601 and the data output unit 1606 simultaneously.

ROM's 1620 to 1623 are connected to the processors 1613 to 1616 to respectively provide a processing program to the processor.

Photoelectric converters 1681 to 1686 are connected to the memories 1631 to 1636. In this embodiment, these photoelectric converters respectively operate with lights having wavelengths λ1 to λ6.

Further, the variable-wavelength photoelectric converters 1691 to 1696 are connected to the data input unit 1601, the processors 1613 to 1616 and the data output unit 1606. In this embodiment, these variable-wavelength photoelectric converters respectively emit or receive lights having wavelengths λa to λf (note that these wavelengths correspond to any of the wavelengths λ1 to λ6 outputted from the photoelectric converters 1681 to 1686). In this embodiment, the wavelengths of the input/output lights to/from the photoelectric converters on the memory side are fixed, and those on the side of processors and data input/output units are variable. However, the input/output light wavelengths on the memory side may be variable and those on the side of processors and data input/output units may be fixed.

The light signals emitted from these photoelectric converters are multiplexed on an optical transmission path 1673, and transmitted among the photoelectric converters.

A synchronizing signal generating unit 1618 generates a synchronizing signal 1619 at every 1/30 sec as in the previous embodiments. This time interval is not limited to 1/30, but it can be freely changed.

A path selecting unit 1671 generates a path selecting signal 1672 for changing the wavelength used by the photoelectric converters 1691 to 1696 in synchronization with the synchronizing signal 1619.

Figure 18:
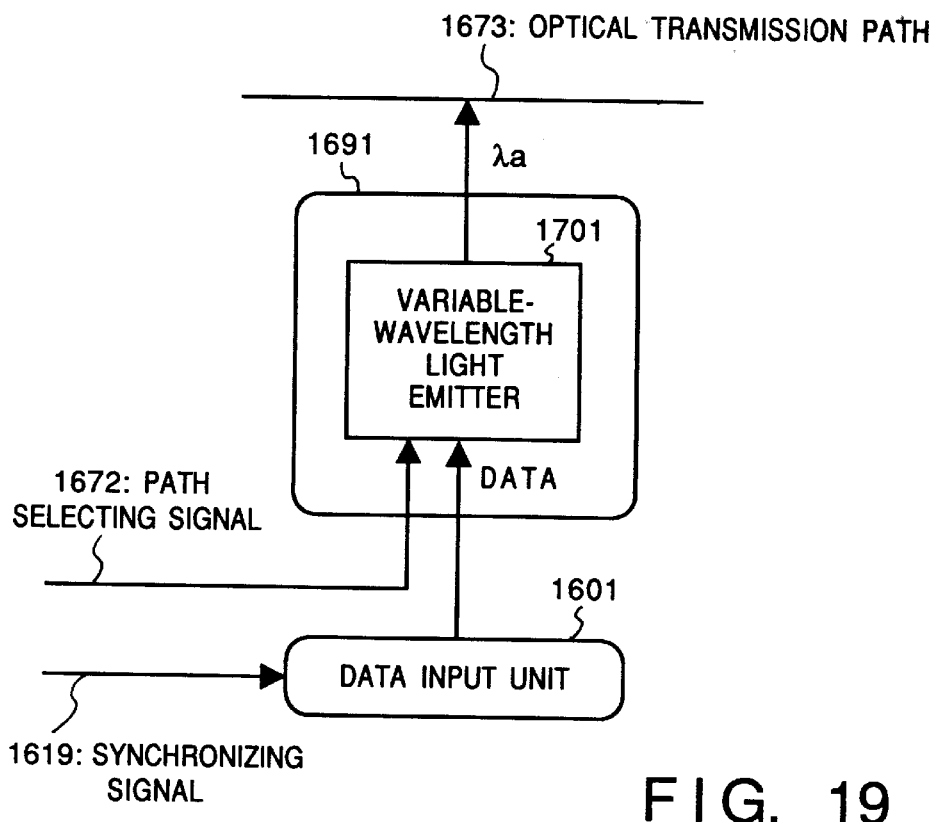
FIG. 18 is a block diagram showing the configuration of a variable-wavelength photoelectric converter connected to a data input unit of FIG. 17.
Figure 19:
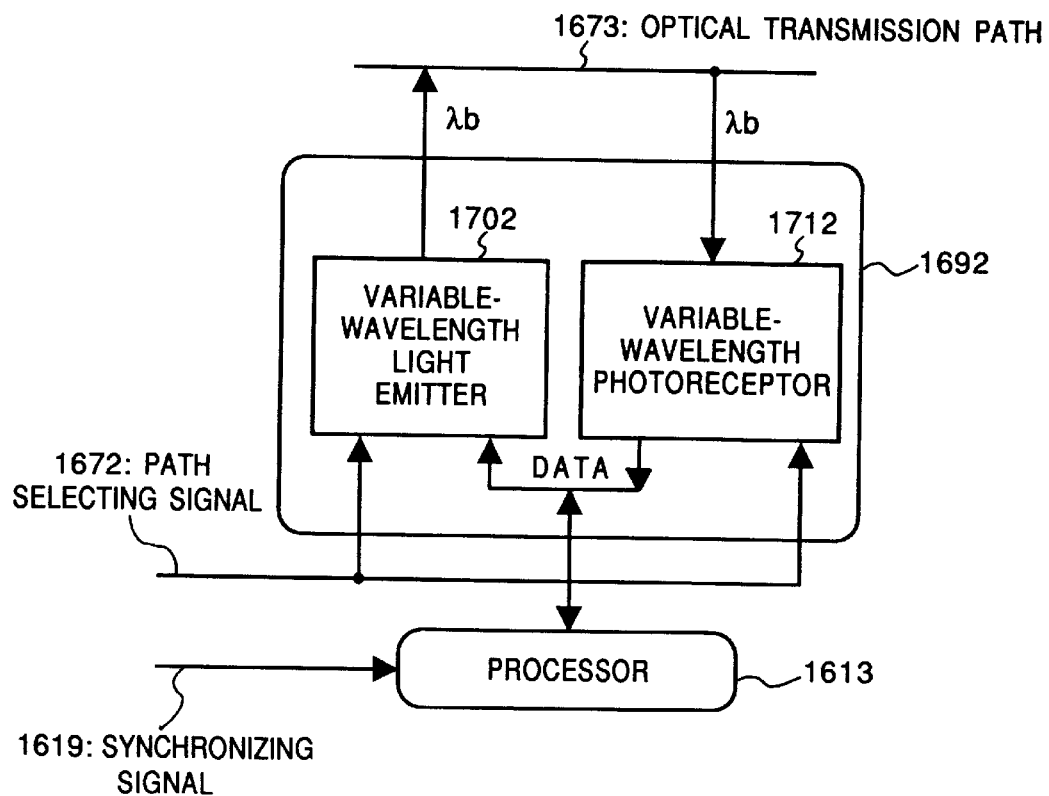
FIG. 19 is a block diagram showing the configuration of the variable-wavelength photoelectric converter connected to a processor of FIG. 17.
Figure 20:
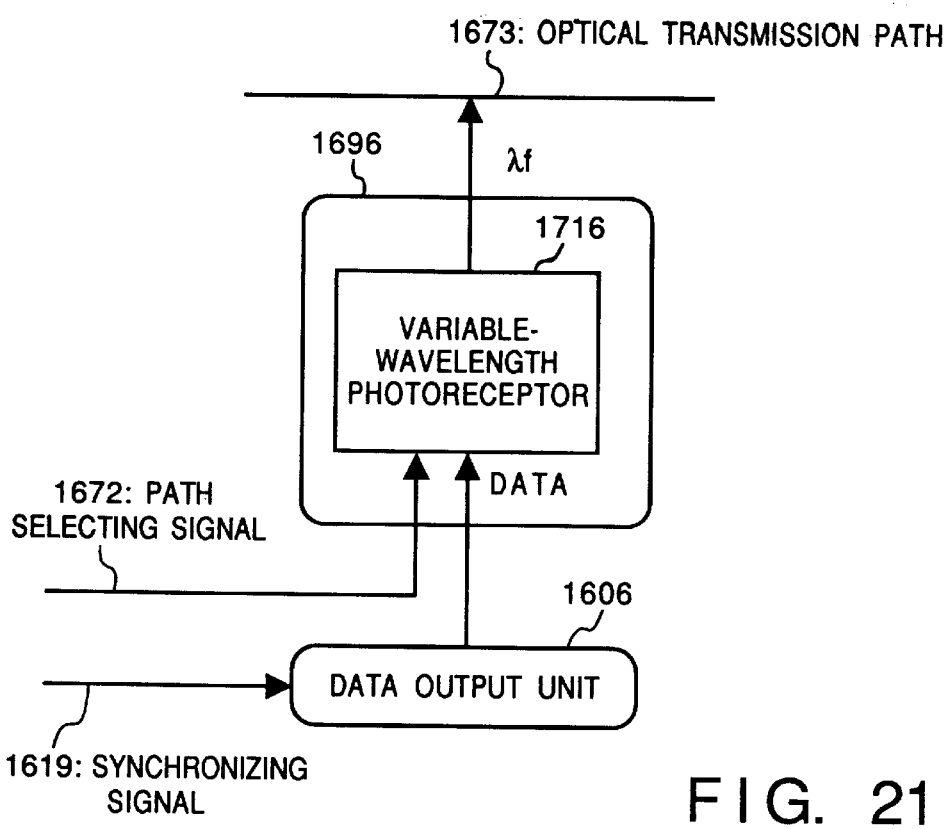
FIG. 20 is a block diagram showing the configuration of the variable-wavelength photoelectric converter connected to a data output unit of FIG. 17.

FIGS. 18 to 20 show the configuration of the photoelectric converters.

FIG. 18 shows the photoelectric converter 1691 connected to the data input unit 1601.

The variable-wavelength light emitter 1701 selects the wavelength $\lambda a$ from the wavelengths $\lambda 1$ to $\lambda 6$ as the wavelength of an output light, in accordance with the path selecting signal 1672. The data input unit 1601 transfers data to the variable-wavelength photoelectric converter 1691 in synchronization with the synchronizing signal 1619. The photoelectric converter 1691 converts the electric signal into an optical signal having the wavelength $\lambda a$, and outputs the optical signal onto the optical transmission path 1673. The data is transmitted to the memory connected to the photoelectric converter for the wavelength $\lambda a$.

FIG. 19 shows the photoelectric converter 1692 connected to the processor 1613.

A variable-wavelength light emitter 1702 and a variable-wavelength photoreceptor 1712 select the wavelength $\lambda b$ in accordance with the path selecting signal 1672. The processor 1613 transmits data from/to the photoelectric converter 1692 in synchronization with the synchronizing signal 1619. The photoelectric converter 1692 converts the electric signal into an optical signal having the wavelength $\lambda b$, and outputs the optical signal onto the transmission path 1673. The data is transmitted to/from the memory connected to the photoelectric converter for the wavelength $\lambda b$ through the optical transmission path 1673.

Note that the above configuration apply to the variable-wavelength photoelectric converters 1693 to 1695 connected to the processors 1614 to 1616.

FIG. 20 shows the variable-wavelength photoelectric converter 1696 connected to the data output unit 1606.

The variable-wavelength photoreceptor 1716 selects the wavelength $\lambda f$ from the wavelengths $\lambda 1$ to $\lambda 6$ in accordance with the path selecting signal 1672. The photoreceptor 1716 converts the data, transmitted through the optical transmission path 1673 from the memory connected to the photoelectric converter for the wavelength $\lambda f$, from the optical signal of the wavelength $\lambda f$ into an electric signal, and outputs the electric signal to the data output unit 1606 in synchronization with the synchronizing signal 1619.

Figure 21:
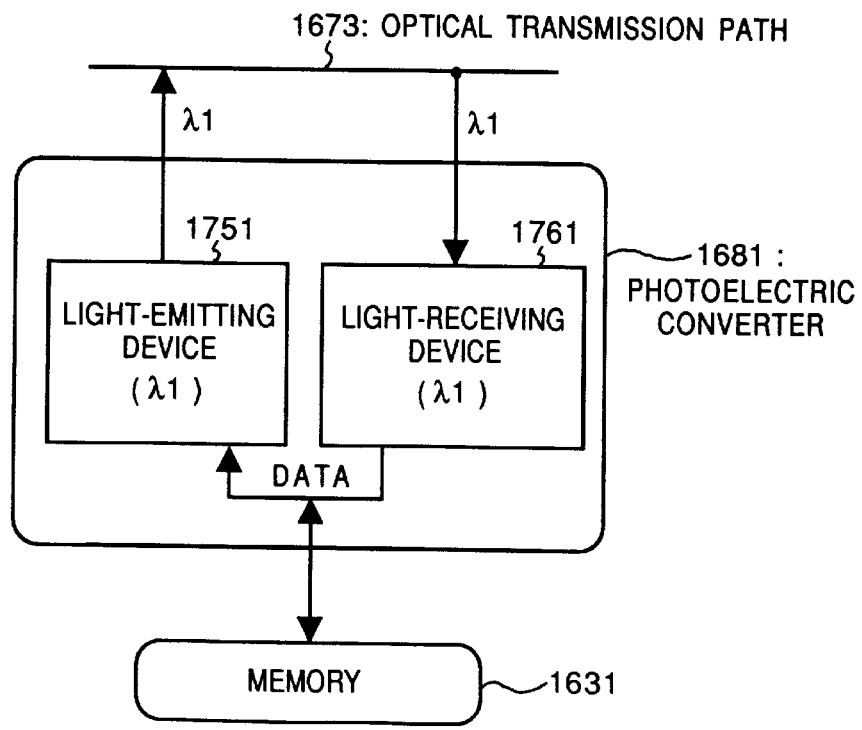
FIG. 21 is a block diagram showing the configuration of the variable-wavelength photoelectric converter connected to a memory of FIG. 17.

FIG. 21 shows the fixed-wavelength photoelectric converter 1681 connected to the memory 1631. In FIG. 21, a light-emitting device 1751 and a light-receiving device 1761 respectively emit/receive light having the wavelength $\lambda 1$. The memory 1631 is connected the processors for the wavelength $\lambda 1$, the data input unit 1601 or the data output unit 1606 via the photoelectric converter 1681 and the optical transmission path 1673 for transmission of data.

Note that the above configuration apply to the fixed-wavelength photoelectric converters 1682 to 1686 connected to the memories 1632 to 1636.

Figure 22:
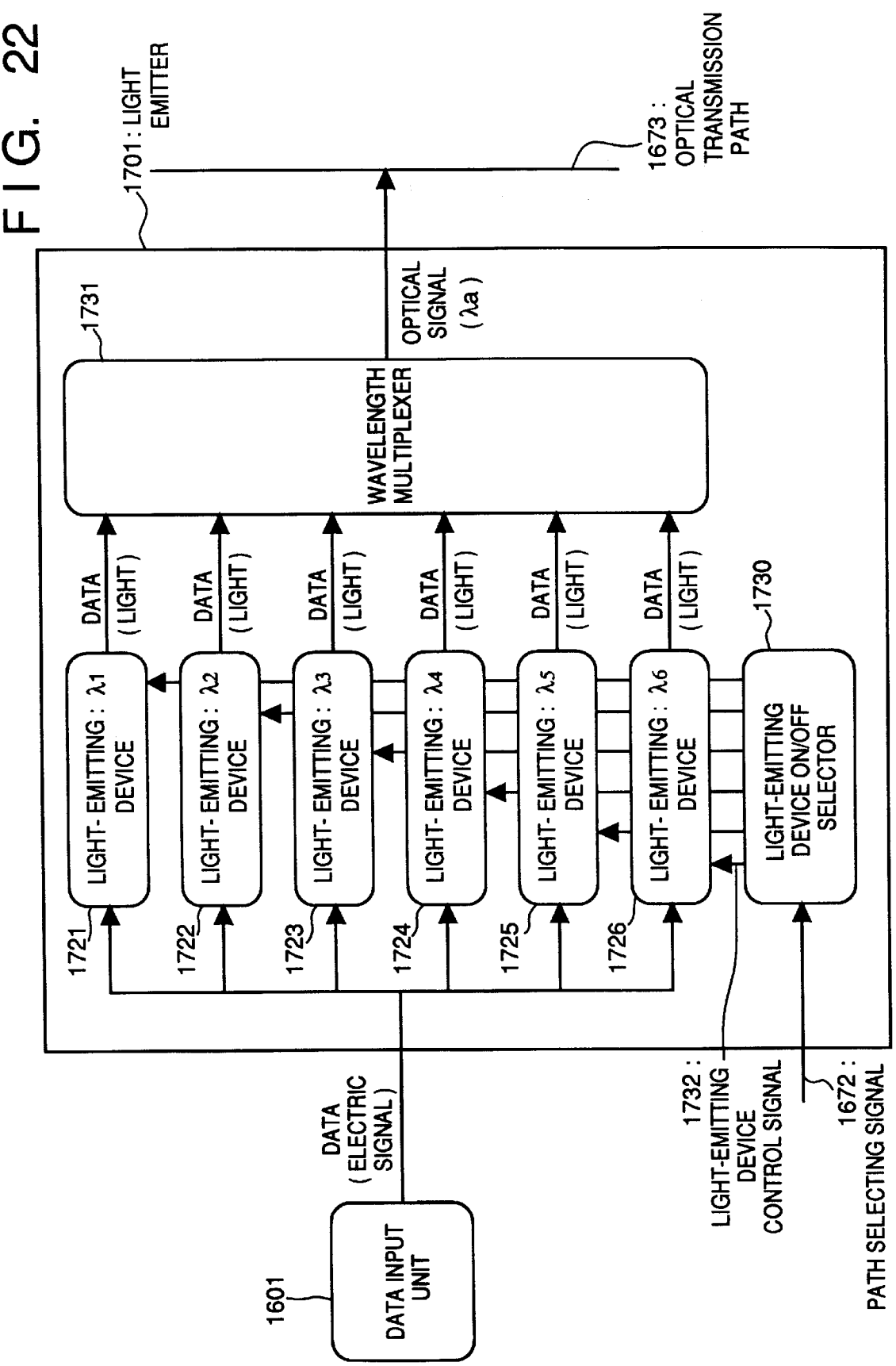
FIG. 22 is a block diagram showing an example of the configuration of a light emitter used in the variable-wavelength photoelectric converter.

FIG. 22 shows an example of the light emitter used in the variable-wavelength photoelectric converter.

This light emitter uses light-emitting devices 1721 to 1726 respectively having a necessary wavelength ($\lambda 1$ to $\lambda 6$), controls the light-emitting devices by a light-emitting device control signal 1732 outputted from a light-emitting device on/off selector 1730, in accordance with the path selecting signal 1672, and outputs data converted from an electric signal into an optical signal, through a wavelength multiplexer unit 1731, onto the optical transmission path 1673, thus making the output optical signal variable-wavelength.

Note that this is merely one example of the variable-wavelength light emitter, and a plurality of variable-wavelength light emitting devices which emit lights of a plurality of wavelengths can realize the same function as that of this example.

Figure 23:
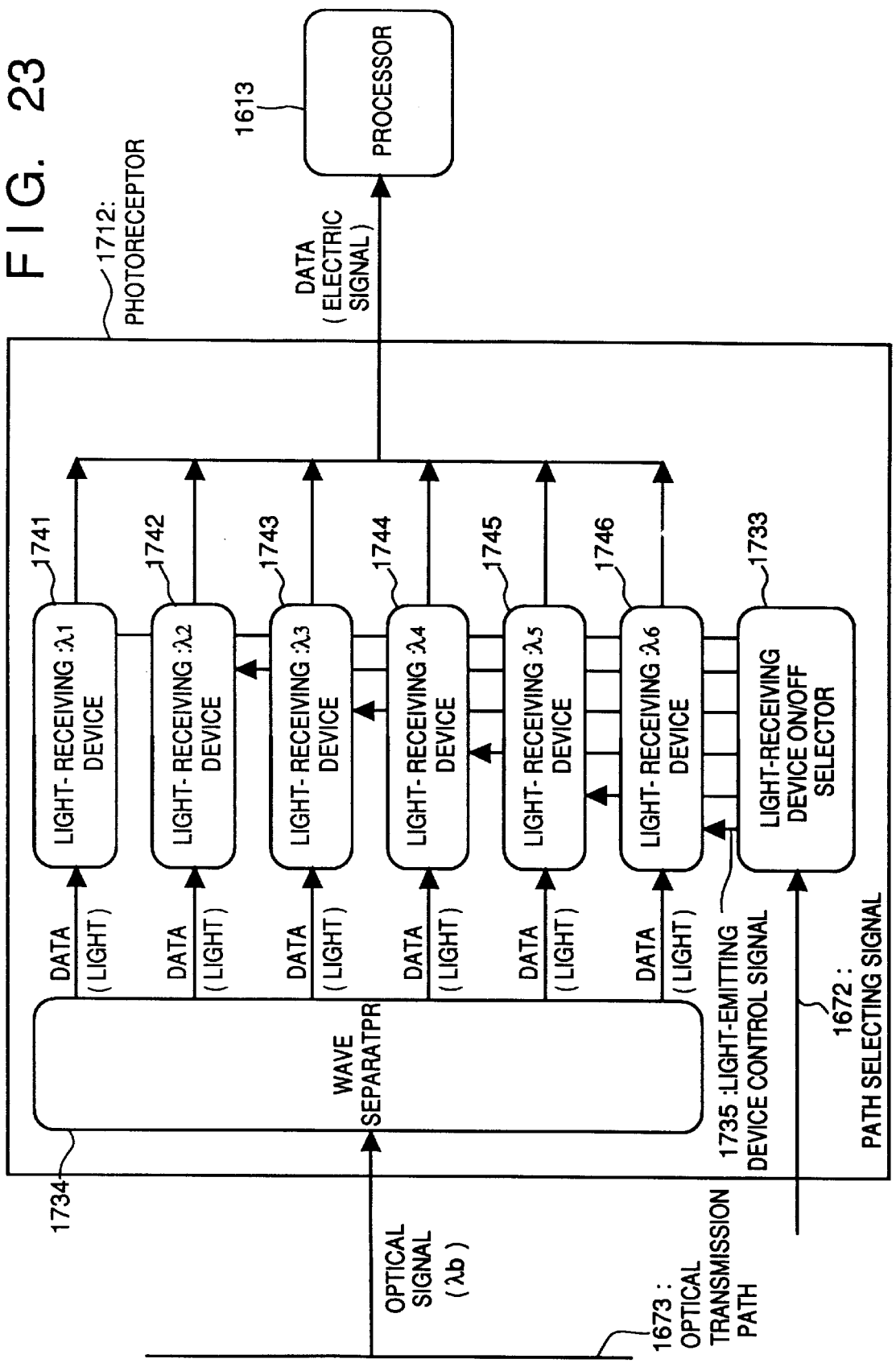
FIG. 23 is a block diagram showing another example of the configuration of a light emitter used in the variable-wavelength photoelectric converter.

FIG. 23 shows an example of the photoreceptor used in the variable-wavelength photoelectric converter.

This photoreceptor separates a multiplexed optical signal transmitted from the optical transmission path 1673 into lights of respective wavelengths, using a wave separator 1734. The photoreceptor uses light-receiving devices 1741 to 1746 with respect to the wavelengths, and controls the light-receiving devices by a light-receiving device control signal 1735 outputted from a light-receiving device on/off selector 1733, in accordance with the path selecting signal 1672, thus making the input optical signal variable-wavelength.

Note that this is merely an example of the variable-wavelength photoreceptor, and a variable-wavelength light-receiving device which receives lights of a plurality of wavelengths can realize the same function as that of this example.

Figure 24:
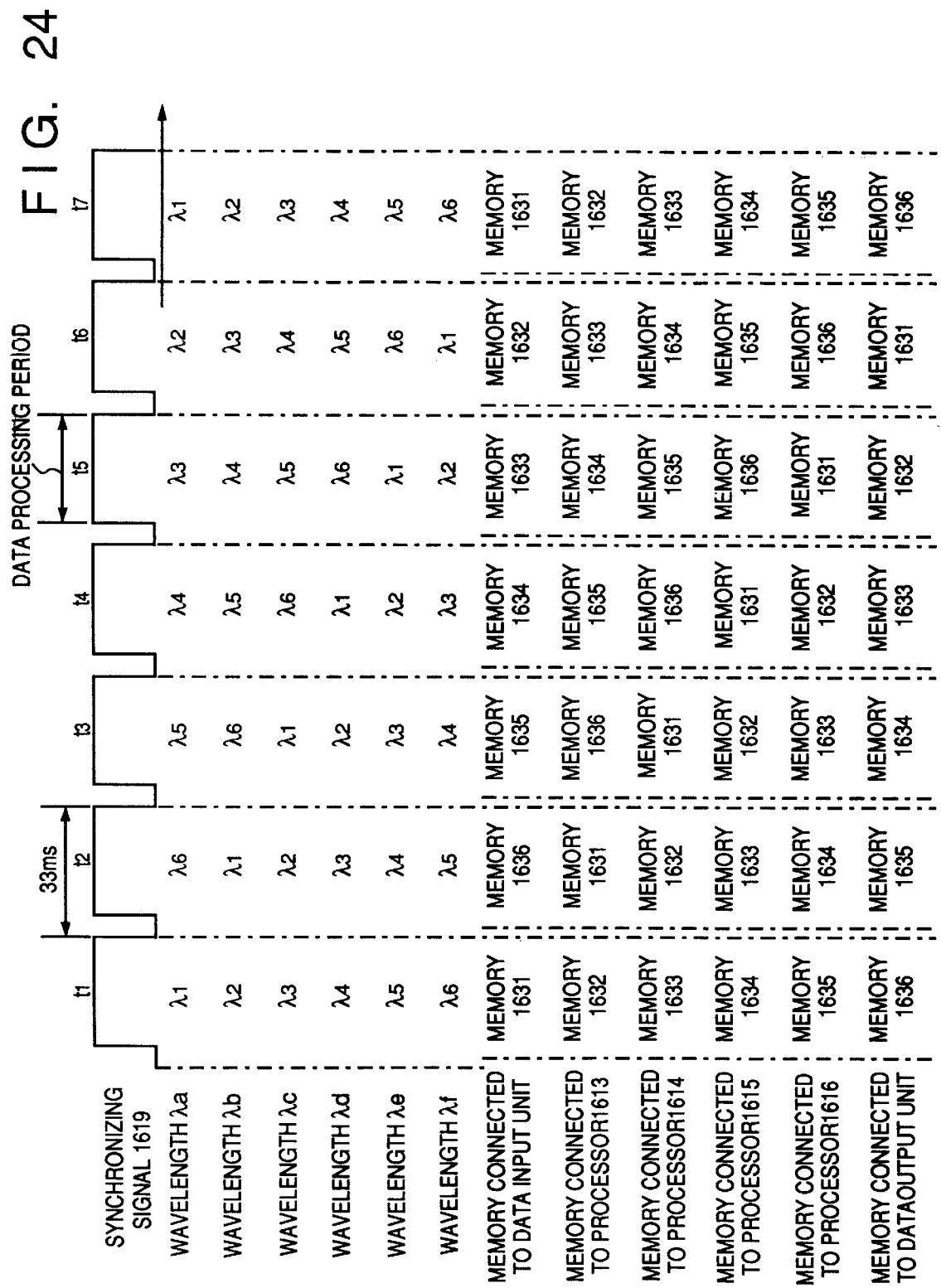
FIG. 24 is an explanatory view showing the configuration of optical wavelengths used in a fixed-wavelength type photoelectric converter to optical wavelengths used in the variable-wavelength photoelectric converter, and the connection among the data input unit, the processors, the data output unit and the memories, along with the timing of a synchronizing signal.

FIG. 24 shows the correspondence of optical wavelength $\lambda 1$ to $\lambda 6$ used the photoelectric converter on the memory side to optical wavelengths $\lambda a$ to $\lambda f$ used in the variable-wavelength photoelectric converter, along with the timing of a synchronizing signal 1619.

One period of the synchronizing signal is 33 ms corresponding to preferred 30 Frame per second Frame rate. In a data processing period, the synchronizing signal 1619 is maintained at a high level. During this period, the processor performs processing upon data, and the data input and output units input/output data to/from the corresponding memory. At the final point of the data processing period, the synchronizing signal 1619 is maintained at a low level. At this point, the path selecting unit 1671 changes the path selecting signal 1672 to change the wavelengths used by the variable-wavelength photoelectric converters 1691 to 1696, thus switches over the connection between the memories, and the processors and the input/output units. Note that the synchronizing signal 1619 repeats this cycle. Hereinafter, the respective periods of the synchronizing signal are referred to as t1, t2, . . . , and the explanation will be made with respect to each period.

Note that the operation of the present embodiment will be described with reference to FIG. 6A, which is the flowchart showing the expansion of JPEG-based compressed data, as one example of the operation. As mentioned above, the compression method is a well-known compression method, and it is not limited to the present embodiment.

Note that the data includes header information, table information for regenerating the table used for compression and compressed data.

(1) Period t1

When the system of the present embodiment starts to operate, in a period where the synchronizing signal 1619 is indicative of a data processing period, the CPU of the data input unit 1601 transfers compressed data for one frame, in the format 601 in FIG. 6, from the disk 1612 to a predetermined position of the memory 1631 (step S601 in FIG. 6A).

(2) Period t2

In the subsequent low-level period where the synchronizing signal is at the low level, the path selecting unit 1671 generates a signal to shift memory assignment by one place, to shift the correspondence between the memories and the data input unit 1601, processors 1613 to 1616 and the data output unit 1606 by one place, as shown in FIG. 24. Note that the synchronizing signal 1619 is connected to the reset terminal of the processors 1613 to 1616 so as to avoid data conflict in this switching period.

In the subsequent data processing period, the data input unit 1601 reads the second image information from the disk 1612, and writes the read data into a predetermined position of the memory 1636 (step S601). At the same time, the processor 1613 generates the table 603 for entropy decoding with respect to the data in the memory 1631 from the data 601, in accordance with the program stored in the program ROM 1620, and performs entropy decoding upon the data (step S602). As this embodiment treats Huffman-coded data, the entropy decoding is made based on the Huffman-decoding.

The processor 1613 writes the entropy-decoded data and the table into a predetermined position of the memory 1631. Then the processor 1613 becomes into idle status and waits for the next correspondence-switching period.

(3) Period t3

In the subsequent low-level period where the synchronizing signal is at the low level, the path selecting unit 1671 generates a signal to shift memory assignment by one place, to shift the correspondence between the memories and the data input unit 1601, processors 1613 to 1616 and the data output unit 1606 by one place, as shown in FIG. 24.

In the subsequent data processing period, the data input unit 1601 reads the third image information from the disk 1612, and writes the read data into a predetermined position of the memory 1635 (step S601). At the same time, the processor 1613 performs entropy decoding upon the image data in the connected memory 1636 (step S602).

At this time, the processor 1614 performs inverse quantization (S603) upon the first data in the memory 1631, in accordance with the program stored in the program ROM 1621. The inverse quantization is made by regenerating the quantization table 603 used in the quantization from the data in the memory 1632 and regenerating the AC/DC components of luminance and color difference signals in accordance with this table. The results of the inverse quantization are written into a predetermined position of the memory 1632.

(4) Period t4

In the subsequent low-level period where the synchronizing signal is at the low level, the path selecting unit 1671 generates a signal to shift memory assignment by one place, to shift the correspondence between the memories and the data input unit 1601, processors 1613 to 1616 and the data output unit 1606 by one place, as shown in FIG. 24.

In the subsequent data processing period, the data input unit 1601 reads image information in FIG. 6B from the disk 1612 and writes the read data into a predetermined position of the memory 1634 (step S601) At the same time, the processor 1613 performs entropy decoding upon the image data in the memory 1635 (step S602). At this time, the processor 1614 performs inverse quantization upon the second image data in the memory 1636 (step S603).

At the same time, the processor 1615 performs inverse discrete cosine (IDCT) transformation (step S604) upon the inverse-quantized data in the memory 1631, in accordance with the program stored in the ROM 1622. As the compressed data in the present embodiment is two-dimensional discrete cosine transformed in 8×8 pixel block units and expressed as one DC coefficient and sixty-three AC coefficients, inverse transformation of the two-dimensional discrete cosine transformation is performed. A luminance signal and a color difference signal for one frame resulting from the inverse transformation are written into a predetermined position of the memory 1633.

(5) Period t5

In the subsequent low-level period where the synchronizing signal is at the low level, the path selecting unit 1671 generates a signal to shift memory assignment by one place, to shift the correspondence between the memories and the data input unit 1601, processors 1613 to 1616 and the data output unit 1606 by one place, as shown in FIG. 24.

In the subsequent data processing period, the data input unit 1601 reads the fifth image information from the disk 1612, and writes the read data into a predetermined position of the memory 1633 (step S601) At the same time, the processor 1613 performs entropy decoding upon the image data in the memory 1634 (step S602). At this time, the processor 1614 performs inverse quantization (step S603) upon the second image data in the memory 1636.

At the same time, the processor 1615 performs IDCT (step S604) upon the inverse-quantized data in the memory 1636.

At this time, the processor 1616 converts the Y, Cb and Cr data in the memory 1631 into R, G and B signals for displaying an image on a bitmap display, in accordance with the program stored in the ROM 1623 (step S605). This conversion is made by:

R=Y+1.40200×Cr

G=Y−0.34414×Cb−0.71414×Cr

B=Y+1.77200×Cb (6) Period t6

In the subsequent low-level period where the synchronizing signal is at the low level, the path selecting unit 1671 generates a signal to shift memory assignment by one place, to shift the correspondence between the memories and the data input unit 1601, processors 1613 to 1616 and the data output unit 1606 by one place, as shown in FIG. 24.

In the subsequent data processing period, the data input unit 1601 reads the sixth image information from the disk 1612, and writes the read data into a predetermined position of the memory 1632 (step s601) At the same time, the processor 1613 performs entropy decoding upon the image data in the memory 1633 (step S602). At this time, the processor 1614 performs inverse quantization upon the fourth image data in the memory 1634 (step S603).

At the same time, the processor 1615 performs IDCT (step S604) upon the inverse-quantized data in the memory 1635.

At this time, the processor 1616 converts the Y, Cb, Cr data in the memory 1632 into R, G and B signals for displaying an image on the bitmap display, in accordance with the program stored in the ROM 1624 (step S605).

Figure 25:
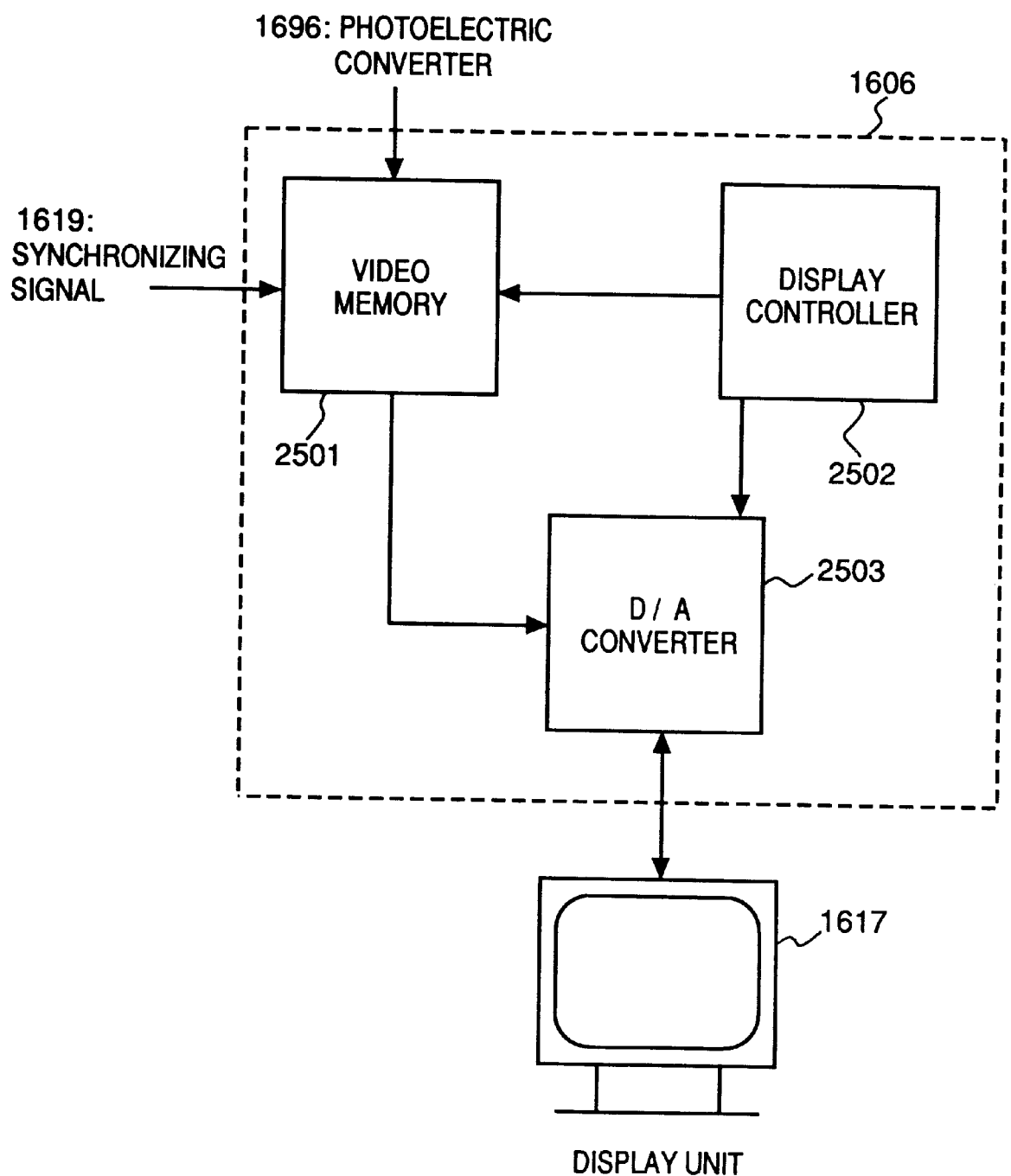
FIG. 25 is a block diagram showing the configuration of a data output unit.

At the same time, the data output unit 1606 writes the first data stored in the predetermined position of the memory 1631 into the video memory 2501 of the data output unit 1606. FIG. 25 shows the construction of the data output unit 1606.

The data output unit 1606 sequentially displays data read output the video memory 2501 via the D/A converter 2503 under the control of the display controller 2502 (step S606).

As the memory units are six, the above six periods are repeated.

As described above, the system having the above configuration continuously performs the above operation, thus it can continuously expand and display the compressed image data read from the data input unit 1601 in actual executing time. In this system, the respective image data initially read into a memory once is kept in the same memory until the processing is completed. This eliminates data transfers usually accompanying with the transition of processing steps. For this reason, this system does not exhibit needless data transfer time, and raises the processing speed.

Further, as the connection between the memories and the processors is multiplexed using light wavelengths, the present system needs fewer connection lines between them. Thus, the circuitry can be down-sized and simplified so that a system can be provided with low costs.

The present invention is not limited to the above embodiments and various changes and modifications can be made within the spirit and scope of the present invention. Therefore, to apprise the public of the scope of the present invention, the following claims are made.

What is claimed is:

1. An information processing apparatus comprising:

storage means for storing data into a plurality of independent storage areas;

processing means including a plurality of processors for respectively processing the data stored in the plurality of storage areas;

connecting means for connecting the plurality of storage areas to the plurality of processors using electromagnetic waves having wavelengths different for each connection; and control means for changing connections between the plurality of storage areas and the plurality of processors utilizing said connecting means, wherein said control means controls combinations of the processors and the storage areas by changing the wavelength selection.

2. The information processing apparatus according to claim 1, wherein said connecting means includes:

fixed frequency communication means for communicating between the plurality of storage areas and the plurality of processors, at fixed frequencies different from each other; and frequency variable communication means for selectively communicating between the plurality of storage areas and the plurality of processors at any of the fixed frequencies, wherein said control means controls combinations of the plurality of processors and the plurality of storage areas by changing the frequencies of said frequency variable communication means in a predetermined order.

3. The information processing apparatus according to claim 2, wherein continuous frames of digital video data are stored into the plurality of storage areas, and wherein the processors perform a predetermined stage of the decoding on the data stored in the storage areas, for each respective frame.

4. An information processing apparatus comprising:

storage means for storing data into a plurality of independent storage areas;

processing means for having a plurality of processors for respectively processing data stored in the plurality of storage areas;

connecting means for connecting the plurality of storage area to the plurality of processors; and control means for changing connection between the plurality of storage areas and the plurality of processors by said connecting means;

wherein said connecting means connects the plurality of storage areas to the plurality of processors with optical signals having wavelengths different from each other, and controls changeover of connection between the plurality of storage areas and the plurality of processors by changing combinations of light wavelengths transmitted with respect to the plurality of storage areas and light wavelengths transmitted with respect to the plurality of processors.

5. An information processing apparatus comprising:

a plurality of independent memory units;

input means for inputting compressed image data into one of the plurality of independent memory units;

a plurality of fixed wavelength communication means for transmitting optical signals having wavelengths different from each other, corresponding to the plurality of independent memory units;

variable-wavelength communication means for transmitting optical signals of a desired one of the wavelengths used by said plurality of fixed wavelength communication means;

a plurality of processors, connected to said variable-wavelength communication means, for simultaneously performing processing predetermined stages of decoding of image data upon data stored in the plurality of independent memory units;

switching means for switching the plurality of independent memory units and the plurality of processors in a predetermined order by changing the wavelength of the optical signals transmitted by said variable-wavelength communication means; and display means for displaying an image based on data processed by all the plurality of processors and stored in one of the plurality of independent memory units.

6. An information processing apparatus comprising a plurality of processing units and controlling means, wherein each of said plurality of processing units further comprises:

memory means for storing data in a first and a second storage area;

processing means for processing data stored in the first storage area and writing a processed result in the second storage area; and direct memory access means for reading out data from the second storage area in the memory means of another one of said plurality of processing units in an adjacent stage and writing the data in the first storage area in its own said memory means, and wherein said controlling means generates transmission periods and processing periods alternately, controls said direct memory access means in each of said plurality of processing units to perform a respective operation synchronously in the transmission periods, and controls said processing means in each of said plurality of processing units to perform a respective operation synchronously in the processing periods.

7. The information processing apparatus according to claim 6, wherein continuous frames of digital video data are stored into the first storage area, and wherein said processing means performs a predetermined stage of a decoding process, on the data stored in the first storage area, for each respective frame.

8. The information processing apparatus according to claim 6, further comprising data output means for outputting the data, wherein said data output means displays digital video-images.

9. The information processing apparatus according to claim 6, wherein the data stored in said storage means is digital video data, and wherein said processing means performs a predetermined stage of image expansion in accordance with the JPEG Recommendations.

10. The information processing apparatus according to claim 6, wherein said processing means performs a process of a continuous sequence of processes.

11. The information processing apparatus according to claim 6, wherein the data stored in said memory means is digital video data.

12. An information processing apparatus comprising:
  memory means including a plurality of memory banks for storing data;
  a plurality of processing means, each connected to a respective one of said memory banks and each performing a respective operation for processing data stored in said respective one of said memory banks and writing a processed result in said respective one of said memory banks;
  switch means for switching connections between said plurality of memory banks and said plurality of processing means; and
  control means for controlling said switch means to switch the connections in each switching period so as to connect each of said plurality of memory banks with a respective one of said plurality of processing means, which follows a currently-connected one of the processing means in a predetermined order, thereby connecting each of said plurality of memory banks with all of said plurality of processing means in turn, in the predetermined order, cyclically.

13. The information processing apparatus according to claim 12, wherein continuous frames of digital video data are stored into the plurality of memory banks, and wherein each of the plurality of processing means performs a predetermined stage a decoding process on the data stored in said respective one of the plurality of memory banks, for each respective frame.

14. The information processing apparatus according to claim 12, further comprising data output means for outputting the data, wherein said data output means displays digital video images.

15. The information processing apparatus according to claim 12, wherein the plurality of processing means performs processing at respective stages of image expansion in accordance with the JPEG Recommendations.

16. The information processing apparatus according to claim 12, wherein the plurality of processing means each respectively perform a process of a continuous sequence of processes.

17. The information processing apparatus according to claim 12, wherein the data is digital video data.

* * * * *

UNITED STATES PATENT AND TRADEMARK OFFICE
CERTIFICATE OF CORRECTION

PATENT NO. : 5,923,339

DATED      : July 13, 1999

INVENTOR(S): ATSUSHI DATE

It is certified that error appears in the above-identified patent and that said Letters Patent is hereby corrected as shown below:

SHEET 6

Fig. 6B, "S601" should read --601--.

COLUMN 1

Line 34, "to" should read --in--; and
    Line 51, "have" should read --has--.

COLUMN 3

Line 25, "and data transfer" should be deleted.

COLUMN 4

Line 4, "cross point" should read --cross-point--.

COLUMN 5

Line 53, "minor-art." should read --the prior art.--;
    Line 59, "i.e." should read --i.e.,--.

COLUMN 6

Line 49, "for" should read --to--;
    Line 51, "the" should be deleted.

COLUMN 7

Line 11, "S602)" should read --S602).--

UNITED STATES PATENT AND TRADEMARK OFFICE
CERTIFICATE OF CORRECTION

PATENT NO. : 5,923,339

DATED : July 13, 1999

INVENTOR(S): ATSUSHI DATE

It is certified that error appears in the above-identified patent and that said Letters Patent is hereby corrected as shown below:

COLUMN 8

Line 52, "displays-the" should read --displays the--;
    Line 64, "data," should read --data;-- and "as far as" should read --in so far as--.

COLUMN 10

Line 31, "however," should read --however;--;
    Line 34, "as" should read --as an--;
    Line 35, "cross point" should read --cross-point--;
    Line 39, "cross point" should read --cross-point--;
    Line 40, "cross point" should read --cross-point--; and
    Line 42, "cross point" should read --cross-point--.

COLUMN 11

Line 4, "FIG. 6" should read --FIG. 6A--;
    Line 37, "cross points" should read --cross-points--;
    Lines 38-39, "cross points" should read --cross-points--; and
    Line 66, "811," should read --811;--.

COLUMN 12

Line 4, "cross points" should read --cross-points--;
    Line 6, "cross points" should read --cross-points--;
    Line 28, "the" (first occurrence) should be deleted;
    Line 48, "cross points" should read --cross-points--; and
    Line 50, "cross points" should read --cross-points--.

UNITED STATES PATENT AND TRADEMARK OFFICE
CERTIFICATE OF CORRECTION

PATENT NO. : 5,923,339                            Page 3 of 5
DATED      : July 13, 1999
INVENTOR(S): ATSUSHI DATE It is certified that error appears in the above-identified patent and that said Letters Patent is hereby corrected as shown below:

COLUMN 13

Line 31, "cross points" should read --cross-points--;
    Line 33, "cross points" should read --cross-points--; and
    Line 47, "perform" should read --performs--.

COLUMN 14

Line 19, "cross points" should read --cross-points--; and
    Line 21, "cross points" should read --cross-points--.

COLUMN 15

Line 2, "811," should read --811;--;
    Line 7, "cross points" should read --cross-points--;
    Line 9, "cross points" should read --cross-points--; and
    Line 61, "cross" should read --cross- --.

COLUMN 16

Line 7, "cross point" should read --cross-point--;
    Line 17, "cross point" should read --cross-point--;
    Line 18, "cross point" should read --cross-point--;
    Line 23, "cross point" should read --cross-point--; and
    Line 61, "1686). In" should read --1686). ¶In--.

COLUMN 17

Line 6, "1/30," should read --1/30 sec,-- and "it" should be deleted.
    Line 58, "connected" should read --connected to--.

UNITED STATES PATENT AND TRADEMARK OFFICE
CERTIFICATE OF CORRECTION

PATENT NO. : 5,923,339

DATED : July 13, 1999

INVENTOR(S): ATSUSHI DATE

It is certified that error appears in the above-identified patent and that said Letters Patent is hereby corrected as shown below:

COLUMN 18

Line 34, "used" should read --used in--.

COLUMN 19

Line 3, "FIG. 6," should read --FIG. 6B,--;
Line 24, "the" (second occurrence) should be deleted;
Line 29, "becomes" should read --comes--; and
Line 65, "S601)" should read --S601).--.

COLUMN 20

Line 25, "S601)" should read --S601).--; and
Line 53, "s601)" should read --S601).--.

COLUMN 21

Line 5, "output" should read --out from--.

COLUMN 22

Line 37, "processing" should read --processing of--.

UNITED STATES PATENT AND TRADEMARK OFFICE
CERTIFICATE OF CORRECTION

PATENT NO. : 5,923,339
DATED : July 13, 1999
INVENTOR(S) : ATSUSHI DATE

It is certified that error appears in the above-identified patent and that said Letters Patent is hereby corrected as shown below:

COLUMN 24

Line 14, "a" should read --at a--.

Signed and Sealed this

Thirteenth Day of June, 2000

Attest:

Q. TODD DICKINSON

Attesting Officer

Director of Patents and Trademarks